(12) United States Patent
Cho et al.

(10) Patent No.: US 10,613,423 B2
(45) Date of Patent: Apr. 7, 2020

(54) IMAGE AND LIGHT PROJECTION

(71) Applicant: Eaton Intelligent Power Limited, Dublin (IE)

(72) Inventors: Nam Chin Cho, Peachtree City, GA (US); Parth Joshi, Sugar Hill, GA (US); David George Watt, Forest Park, GA (US)

(73) Assignee: Eaton Intelligent Power Limited, Dublin (IE)

( * ) Notice: Subject to any disclaimer, the term of this patent is extended or adjusted under 35 U.S.C. 154(b) by 17 days.

(21) Appl. No.: 16/000,665

(22) Filed: Jun. 5, 2018

(65) Prior Publication Data

US 2018/0356717 A1 Dec. 13, 2018

Related U.S. Application Data

(60) Provisional application No. 62/516,880, filed on Jun. 8, 2017.

(51) Int. Cl.
| | |
|---|---|
| *G03B 21/20* | (2006.01) |
| *G03B 21/14* | (2006.01) |
| *G02B 27/09* | (2006.01) |
| *G03B 21/28* | (2006.01) |
| *H04N 9/31* | (2006.01) |
| *G03B 29/00* | (2006.01) |

(Continued)

(52) U.S. Cl.
CPC ............ *G03B 21/145* (2013.01); *F21V 21/02* (2013.01); *G02B 27/0977* (2013.01); *G03B 21/206* (2013.01); *G03B 21/208* (2013.01); *G03B 21/2033* (2013.01); *G03B 21/2053* (2013.01); *G03B 21/2066* (2013.01); *G03B 21/28* (2013.01); *G03B 29/00* (2013.01); *G06F 3/017* (2013.01); *G08G 1/0967* (2013.01); *H04N 9/3141* (2013.01); *F21Y 2115/10* (2016.08)

(58) Field of Classification Search
CPC .. G03B 21/14; G03B 21/145; G03B 21/2033; G03B 21/206; G03B 21/2066
USPC .............................................. 353/94, 79, 122
See application file for complete search history.

(56) References Cited

U.S. PATENT DOCUMENTS

| 6,379,012 B1 | 4/2002 | Enochs | |
| 7,195,359 B1 * | 3/2007 | Conti | ........................ F21S 8/00 353/97 |

(Continued)

FOREIGN PATENT DOCUMENTS

| JP | H07264527 | 10/1995 |
| WO | WO 2017/029528 | 2/2017 |

OTHER PUBLICATIONS

International search report for PCT/US2018/036126, dated Sep. 13, 2018.

(Continued)

*Primary Examiner* — William C. Dowling
(74) *Attorney, Agent, or Firm* — King & Spalding LLP

(57) ABSTRACT

A system of projection fixtures includes a first projection fixture recessed in a ceiling, where the first projection fixture includes a first projector device. The system further includes a second projection fixture recessed in the ceiling, where the second projection fixture includes a second projector device. The first projector device is positioned to project a first image on a first surface below the ceiling, and the second and projector device is positioned to project a second image on a second surface below the ceiling.

20 Claims, 29 Drawing Sheets

(51) Int. Cl.
  *F21V 21/02* (2006.01)
  *G08G 1/0967* (2006.01)
  *G06F 3/01* (2006.01)
  *F21Y 115/10* (2016.01)

(56) References Cited

U.S. PATENT DOCUMENTS

| | | | |
|---|---|---|---|
| 8,947,349 B1* | 2/2015 | Hart | G09G 3/002 |
| | | | 345/156 |
| 9,379,012 B2 | 6/2016 | Alptekin | |
| 2010/0107018 A1 | 4/2010 | Benenson | |
| 2010/0289664 A1* | 11/2010 | Mizushima | H04N 9/3129 |
| | | | 340/691.6 |
| 2014/0043516 A1* | 2/2014 | Baker | G03B 21/14 |
| | | | 348/333.1 |

OTHER PUBLICATIONS

Concealite Brochure; ProjEXIT system; May 10, 2010.
Beam: The smart projector that fits in any light socket by Beam Labs, Inc.—Kick-starter. https://www.kickstarter.com/projects/beamlabsinc/beam-the-smart-projector-that-fits-in-any-light-so Feb. 2015.

* cited by examiner

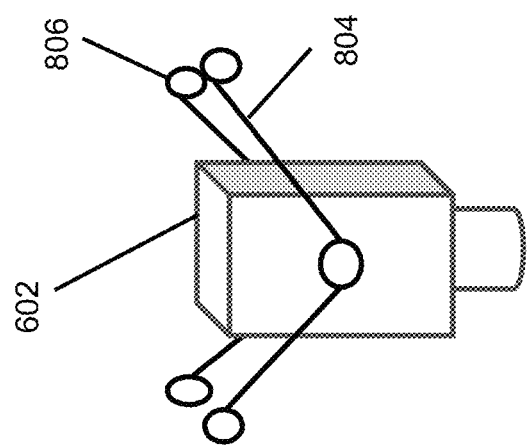
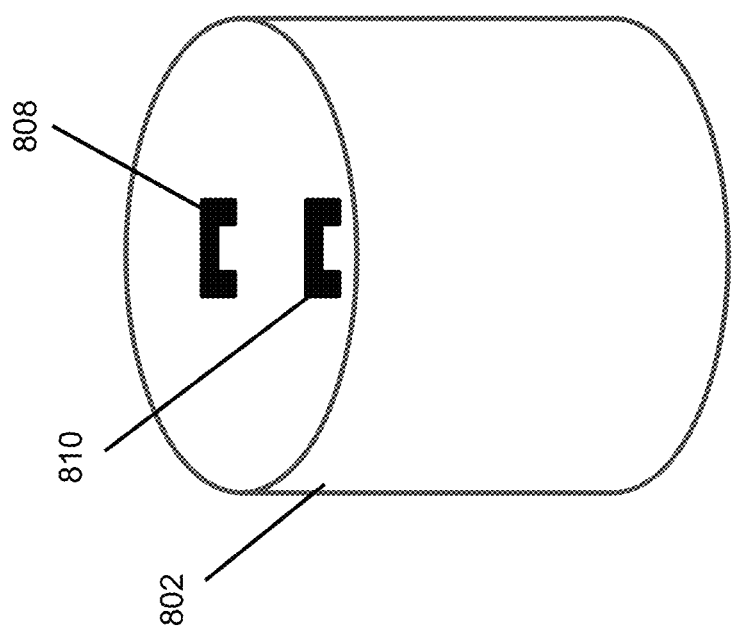
FIG. 8

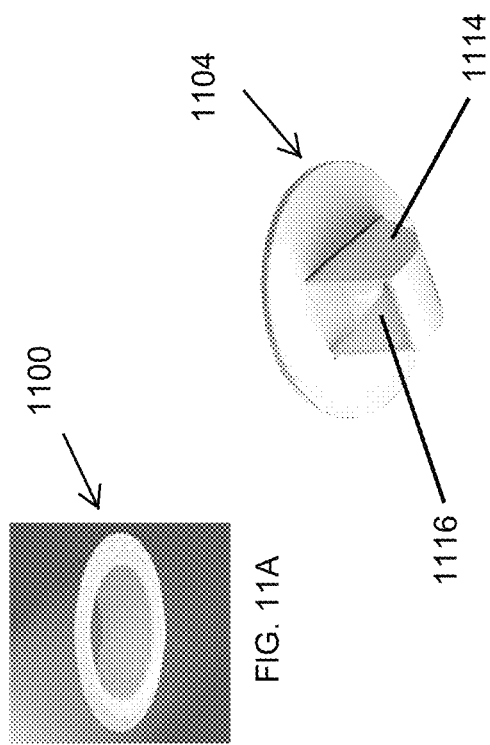
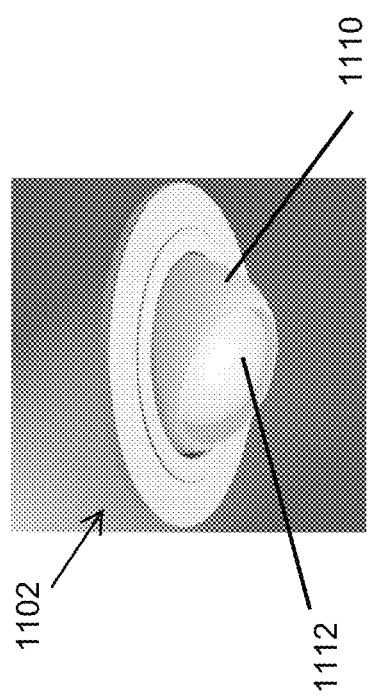
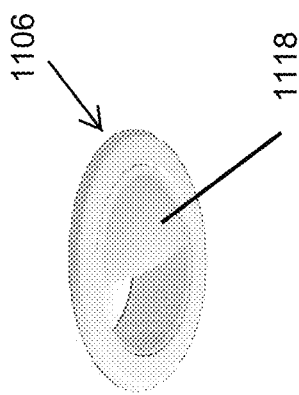
FIG. 11A
FIG. 11B
FIG. 11C
FIG. 11D

IMAGE AND LIGHT PROJECTION

CROSS REFERENCE TO RELATED APPLICATIONS

The present application claims priority under 35 U.S.C. Section 119(e) to U.S. Provisional Patent Application No. 62/516,880, filed Jun. 8, 2017 and titled "Integrated Lighting and Projection," the entire content of which is incorporated herein by reference. The present application is related to U.S. patent application Ser. No. 16/000,656, filed Jun. 5, 2018 and titled "Image And Light Projection," and to U.S. patent application Ser. No. 16/000,648, filed Jun. 5, 2018 and titled "Image And Light Projection," the entire contents of which are incorporated herein by reference.

TECHNICAL FIELD

The present disclosure relates generally to lighting and image projection solutions, and more particularly to methods, systems, and devices of light and image projection.

BACKGROUND

Some standalone projectors are suspended from a ceiling and often require a wiring that is visible below the ceiling. Suspended projectors often interfere with the appearance of a room and may also be distracting to occupants. Some suspended projectors may also interfere with unobstructed views of occupants. Table top and other types of projectors may also take up space that can be used for other purposes and may also interfere with the appearance of the view.

Many light fixtures include a light source and may include other components such as a power source, a controller, wireless or wired communication capability, a heat sink, etc. Some of these lighting fixtures may be indoor lighting fixtures and others may be outdoor lighting fixtures. In some cases, the lighting fixtures may be ideally located or may have locations that support information projection. Thus, a solution that provides projection of light and images with no or minimal interference of a space may be desirable.

SUMMARY

The present disclosure relates generally to lighting and projection solutions, and more particularly to methods, systems, and devices of light and image projection. The projection fixtures described herein may be referred to as lighting and projector fixtures, and the projection systems described herein may be referred to as lighting and projector systems. In an example embodiment, a system of projection fixtures includes a first projection fixture recessed in a ceiling, where the first projection fixture includes a first projector device. The system further includes a second projection fixture recessed in the ceiling, where the second projection fixture includes a second projector device. The first projector device is positioned to project a first image on a first surface below the ceiling, and the second projector device is positioned to project a second image on a second surface below the ceiling.

In another example embodiment, a system of lighting and projector devices includes multiple projection fixtures that are recessed in a ceiling, and a control device configured to control projections of images by one or more projection fixtures of the multiple projection fixtures in response to user inputs provided to the control device.

In another example embodiment, a method of operation of a lighting and projector system includes receiving, by a first recessed projection fixture, an image to be projected. The method further includes receiving, by a second recessed projection fixture, the image to be projected. The method also includes receiving, by the first recessed projection fixture, a command to project the image. The method further includes projecting, by the first recessed projection fixture, the image on a surface below the first recessed projection fixture.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein:

FIG. 8 illustrates a housing can for a recessed projector device according to another example embodiment

FIGS. 11A-11D illustrate trims of lighting and projector fixtures according to example embodiments;

Figure 1:
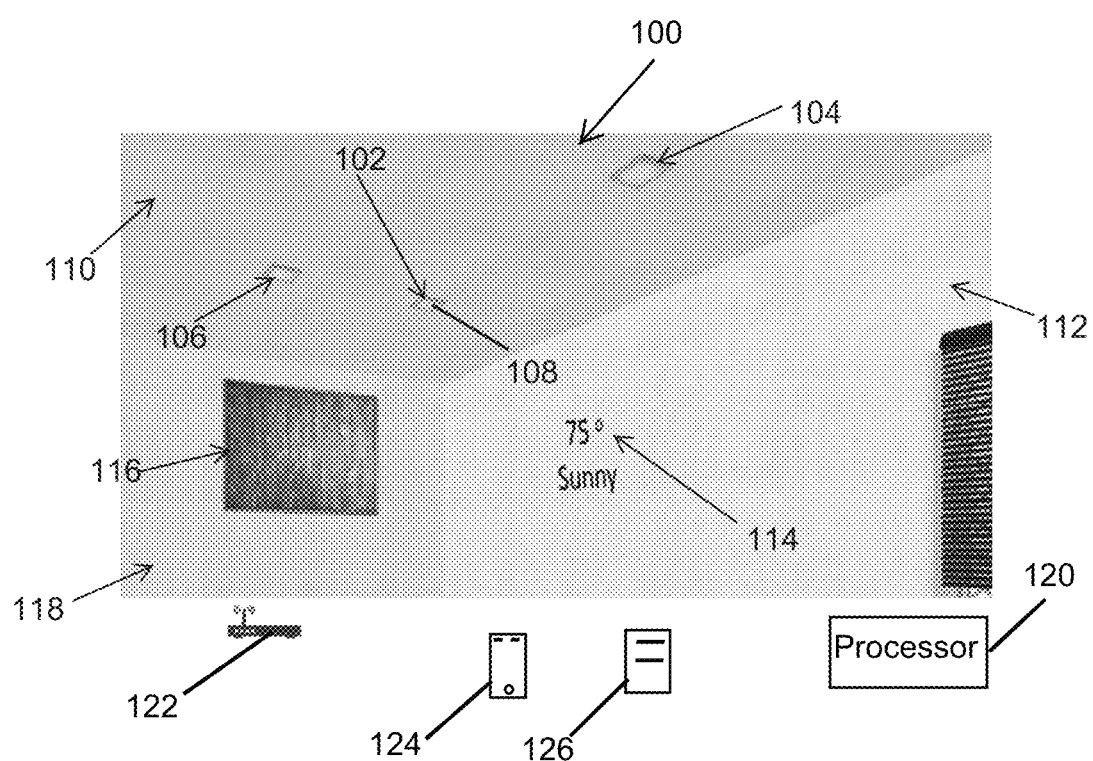
FIG. 1 illustrates a system of lighting and projector fixtures according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals appearing in different figures designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Turning now to the figures, example embodiments are described. FIG. 1 illustrates a system 100 of lighting and projector fixtures according to an example embodiment. In some example embodiments, the system 100 includes lighting and projector fixtures 102, 104, 106 that may be installed in a ceiling 110. One or more of the lighting and projector fixtures 102, 104, 106 may operate to provide light for illumination and to project information. For example, one or more of the lighting and projector fixtures 102, 104, 106 may provide light for illumination in one mode and may operate to project information in another mode. Alternatively, one or more of the lighting and projector fixtures 102, 104, 106 may be recessed lighting fixtures only or recessed projector fixtures only.

Figure 2:
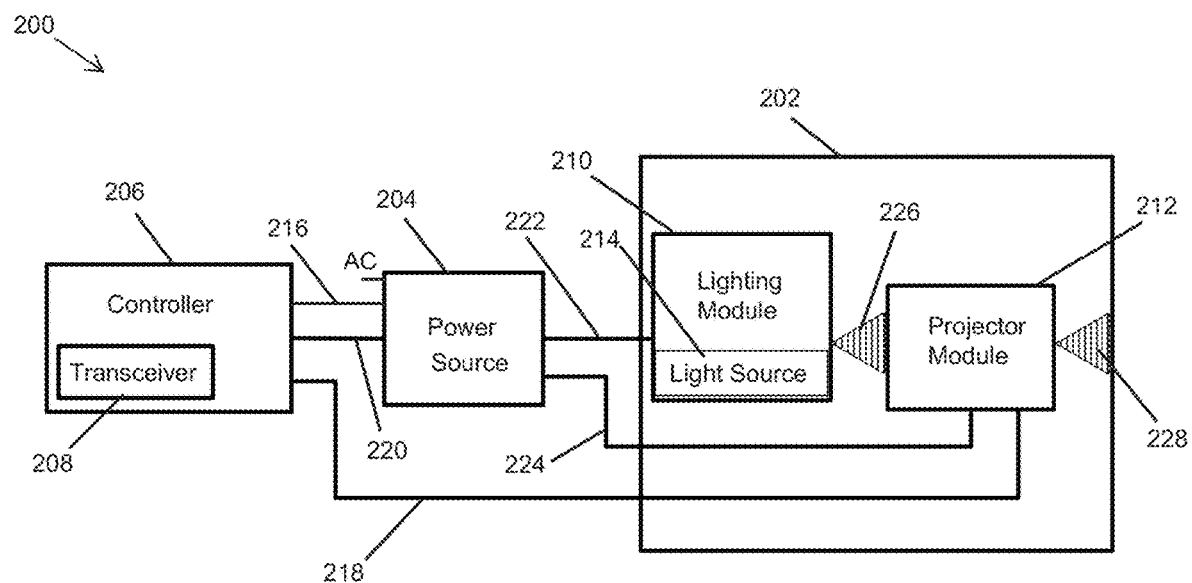
FIG. 2 illustrates a block diagram of a lighting and projector device according to an example embodiment.

In some example embodiments, each lighting and projector fixture 102, 104, 106 may include lighting components and projector components as shown in FIG. 2. When operating as a lighting fixture, each lighting and projector fixture 102, 104, 106 may provide an illumination light. When operating as a projector fixture, each lighting and projector fixture 102, 104, 106 may project an image on a surface such as a wall 112 or a wall 118. Each lighting and projector fixture 102, 104, 106 may be capable of projecting images that are typically provided by standalone projectors. For example, each lighting and projector fixture 102, 104, 106 may project still images and moving images such as video. The images may also include 3-D image(s), such as a 3-D image of a person standing or sitting on a chair, etc. The terms image and images as used throughout this description include text, pictures, video, and other forms of visual information as may be contemplated by those of ordinary skill in the art with the benefit of this disclosure.

In some example embodiments, the images projected by the lighting and projector fixtures 102, 104, 106 may include information such as weather information, traffic information, safety information, instructions, directions, commercial information (e.g., advertisements, sales, etc.), still pictures, motion pictures, etc. To illustrate, the lighting and projector fixture 102 may project weather information 114 on the wall 112, and the lighting and projector fixture 106 may project a picture 116 on the wall 118.

In some example embodiments, each lighting and projector fixture 102, 104, 106 may include a light source that emits a light. For example, the light source may provide an illumination light when the respective lighting and projector fixture 102, 104, 106 operates as a lighting device and may provide a projection light when the respective lighting and projector fixture 102, 104, 106 operates as a projector device. The light source of each lighting and projector fixture 102, 104, 106 may include one or more light emitting diodes (LEDs). Each lighting and projector fixture 102, 104, 106 may also include a power source, such as an LED driver, that provides power to the light source that emits the light for illumination as well as for projection based on the power provided by the power source.

In some example embodiments, each lighting and projector fixture 102, 104, 106 may include a controller that controls the operation of the respective lighting and projector fixture 102, 104, 106. Each lighting and projector fixture 102, 104, 106 may also include a transceiver or another communication component that is used for wireless and/or wired communication between the lighting and projector fixture 102, 104, 106 and control devices, such as a processor 120 (e.g., a local server or a remote cloud server), a mobile device 124, a smart speaker 126, etc. For example, the transceiver of each lighting and projector fixture 102, 104, 106 may receive lighting related instructions and information as well as projection related instructions and information (e.g., an image to be projected on a wall, a screen, or another surface such as a floor or a table) from the processor 120, the mobile device 124, or a smart speaker 126. In some example embodiments, the lighting and projector fixture 102, 104, 106 may receive lighting related instructions and information from a control device directly (e.g., via Bluetooth Low Energy connection) or via a network device 122 (e.g., a wired and/or wireless router and/or gateway device).

To illustrate, instructions to turn on and off the lighting and projector fixtures 102, 104, 106 may be received by the respective transceiver and processed by the respective controller of the fixtures 102, 104, 106. As another example, instructions to set and adjust lighting intensity level, color temperature, and other characteristics of the lights provided by the lighting and projector fixtures 102, 104, 106 may be received by the respective transceivers and processed by the respective controllers.

In some example embodiments, one of the lighting and projector fixtures 102, 104, 106 may operate as a primary lighting and projector device that receives instructions and information from a control device and that communicates with the other lighting and projector fixtures based on the received instructions and information. For example, the lighting and projector fixture 102, 104, 106 may use network (e.g., Wi-Fi) addresses to communicate with each other. A control device, such as the mobile device 124, may also use the network addresses of the lighting and projector fixture 102, 104, 106 to communicate with the devices.

In some example embodiments, a wall switch or a similar device may be used to control the powering on and off the lighting and projector fixture 102, 104, 106. For example, images may be provided to one or more of the lighting and projector fixture 102, 104, 106 regardless of whether the lighting and projector fixture 102, 104, 106 are powered on. When the lighting and projector fixture 102, 104, 106 become powered on, the lighting and projector fixture 102, 104, 106 may start projecting the received image or images.

In some example embodiments, one or more of the lighting and projector fixtures 102, 104, 106 may include an integrated occupancy sensor (e.g., one or more motion sensors) or may be communicably coupled to one or more external occupancy sensors. For example, one or more occupancy sensors may control some operations of the lighting and projector fixtures 102, 104, 106, such as turning on and off and the projection of images at one or more of the lighting and projector fixtures 102, 104, 106 may depend on occupancy detection.

In some example embodiments, one or more of the lighting and projector fixtures 102, 104, 106 may include a diffuser. For example, the lighting and projector fixture 102 may include a diffuser 108. To illustrate with respect to the lighting and projector fixture 102, the diffuser 108 may be in the path of the light from the light source of the lighting and projector fixture 102 when the lighting and projector fixture 102 operates to provide the illumination light. The diffuser 108 may be moved out of the path of the light when the lighting and projector fixture 102 operates as a projector device. For example, the diffuser 108 may be mechanically or electromechanically moveable.

In some example embodiments, the position of the diffuser 108 may be remotely controllable. For example, the controller of the lighting and projector fixture 102 may control the position of the diffuser 108 in response to commands received by the transceiver of the lighting and projector fixture 102. In some example embodiments, the lighting and projector fixtures 104, 106 may each include a diffuser that can be used in a similar manner as described with respect to the diffuser 108.

In some example embodiments, the lighting and projector fixtures 102, 104, 106 may each include a heat sink that is used to dissipate heat. For example, by using a heat sink, use of a fan may be omitted or a smaller fan may be included in the lighting and projector fixtures 102, 104, 106.

By using the same light source to provide light for illumination as well as for projection of images, costs and challenges associated with installing a suspended projector may be reduced. In some example embodiments, the lighting and projector fixtures 102, 104, 106 may be recessed in the ceiling 100 as shown in FIG. 1 or may be recessed or otherwise installed behind another similar structure. By installing the lighting and projector fixtures 102, 104, 106 recessed in the ceiling 110, the lighting and projector fixtures 102, 104, 106 blend in with a space compared to projectors that are suspended from a ceiling or placed on a table or a similar structure.

In some example embodiments, only some of the lighting and projector fixtures 102, 104, 106 may operate as a projector device. For example, the lighting and projector fixture 106 may be a projection only device and the lighting and projector fixtures 102, 104 may be lighting only devices. As another example, the lighting and projector fixtures 102, 104 may be projection only devices and the lighting and projector fixture 106 may be a lighting only device. In some example embodiments, the lighting and projector fixtures 102, 104, 106 may each include a standalone projector device without departing from the scope of this disclosure. In some example embodiments, fewer or more lighting and projector fixtures than shown may be installed in the ceiling 110. In some example embodiments, two or more lighting and projector fixtures may project information on an area, such as the wall 112.

FIG. 2 illustrates a block diagram of a lighting and projector device 200 according to an example embodiment. In some example embodiments, the lighting and projector device 200 corresponds to or may be included in each of the lighting and projector fixtures 102, 104, 106 of FIG. 1. In some example embodiments, the lighting and projector device 200 may correspond to a projection only device, i.e., a projector device.

In some example embodiments, the lighting and projector device 200 may include a lighting and projector module 202, a power source 204, and a controller 206. The controller 206 may control the operation of the lighting and projector module 202 and the power source 204. For example, the controller 206 may include a microprocessor or a microcontroller that executes software code stored in a memory device of the lighting and projector device 200 to control the operations of the lighting and projector device 200. The power source 204 may provide power to the lighting and projector module 202. For example, the power source 204 may receive Alternating Current (AC) power and provide Direct Current (DC) power to the lighting and projector module 202 and to the controller 206.

In some example embodiments, the lighting and projector module 202 may operate to provide light for illumination in one mode and may operate to project information (e.g., weather information, traffic information, safety related information), an image (e.g., a picture), etc. in another mode. To illustrate, the lighting and projector module 202 includes a lighting module 210 and a projector module 212. The lighting module 210 may include a light source 214 that emits a light 226. The light source 214 may include one or more discrete LEDs, one or more organic LEDs (OLEDs), an LED chip on board that includes one or more discrete LEDs, and/or an array of discrete LEDs. In some alternative embodiments, the lighting module 210 may include another type of light source without departing from the scope of this disclosure.

The projector module 212 may include components that support a projection technology that is based on one or more LCD, DLP, laser, etc. The projector module 212 may output a light 228 that projects an image, such as information, a photograph, etc. on a surface. For example, the light 226 from the lighting module 210 may serve as the light used by the projector module 212 to output the light 228. That is, the projector module 212 may not include a separate light source that provides a light to project images. In some example embodiments, the projector module 212 may be oriented or adjustable to project the light 228 on a surface, such as a wall, a table, a floor, etc.

In some example embodiments, the entire or parts of the projector module 212 may be moved from the path of the light 226 such that the light 226 is used as an illumination light to illuminate an area such as a room. For example, the entire or parts of the projector module 212 may be mechanically or electromechanically moved when the lighting and projector module 202 operates to provide illumination light instead of projection of an image. Alternatively, the projector module 212 may pass the light 226 through unmodified by information or image such that the light 228 is a continuation of the light 226, where the light 228 serves as the illumination light. As another alternative, an image may be used to alter the light 226 to generate the light 228, where the light 228 serves as an illumination light.

In some example embodiments, the controller 206 may control the power source 204 to adjust the light 226 provided by the lighting module. For example, the intensity level, the correlated color temperature (CCT), etc. of the light may be controlled by the controller 206 by controlling the power source 204 via an electrical connection 216 (e.g., one or more electrical wires). The controller 206 may also control the projector module 212 via an electrical connection 218. For example, the controller 206 may provide to the projector module 212, via the electrical connection 218, the information, photograph, etc. to be projected by the lighting and projector module 202.

In some example embodiments, the controller 206 may include a transceiver 208 that is used for communication between the lighting and projector module 202 and a remote control device, such as a mobile device. For example, controller 206 may receive via the transceiver 208 lighting control instructions as well as an image to be projected by the lighting and projector module 202. The transceiver 208 may be a wired transceiver, a wireless transceiver, or a combination thereof. In some example embodiments, the transceiver 208 may be a receiver instead of a transceiver without departing from the scope of this disclosure.

In some example embodiments, the controller 206 may control whether the lighting and projector module 202 operates as a lighting fixture (i.e., to provide illumination light) or as a projector (i.e., to project an image). For example, the controller 206 may control the operation mode of the lighting and projector module 202 based on a user input received by the controller 206 via the transceiver 208.

In some example embodiments, the controller 206 may control a diffuser, such as the diffuser 108 of FIG. 1, to move the diffuser out of the path of the light 228 when the light 228 is used to project an image. For example, the controller 206 may control a motor or another device to move the diffuser in or out of the path of the light 226 or the light 228 depending on whether the lighting and projector module 202 is used to provide illumination light or to project an image.

In some example embodiments, the power source 204 may provide power to the controller 206 via an electrical connection 220. The power source 206 may also provide power to the lighting module 210 via an electrical connection 222 and to the projector module 212 via the electrical connection 224. For example, the power source 206 may include one or more AC/DC converters. The power source 206 may also include DC/DC converters that may be used to generate power appropriate for the particular components that are powered by the power source 204.

In some alternative embodiments, the components of the lighting and projector device 200 may be connected in a different configuration than shown without departing from the scope of this disclosure. In some alternative embodiments, the lighting and projector device 200 may include other components without departing from the scope of this disclosure. In some alternative embodiments, some of the components of the lighting and projector device 200 may be integrated into a single component without departing from the scope of this disclosure. In some alternative embodiments, some of the components of the lighting and projector device 200 may be replaced by multiple components without departing from the scope of this disclosure. In some alternative embodiments, the lighting and projector device 200 may correspond to a standard projector without departing from the scope of this disclosure.

Figure 3:
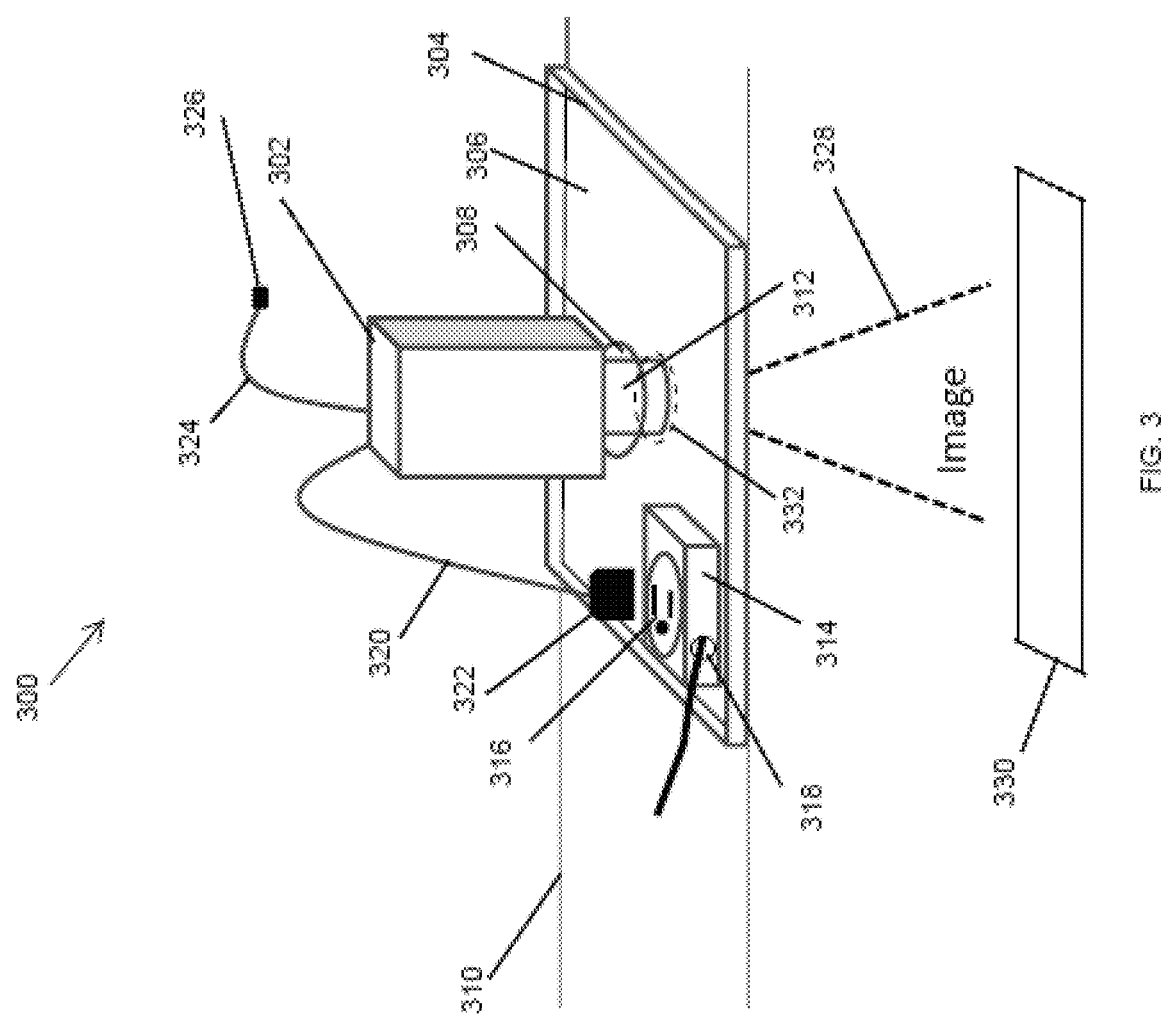
FIG. 3 illustrates a lighting and projector fixture including a recessed projector device according to another example embodiment.

FIG. 3 illustrates a lighting and projector fixture 300 including a recessed projector device 302 according to another example embodiment. In some example embodiments, the lighting and projector fixture 300 may correspond to each of the lighting and projector fixtures 102, 104, 106. In some example embodiments, the recessed projector device 302 may correspond to the lighting and projector device 200 shown in FIG. 2. In some example embodiments, the recessed projector device 302 may correspond to or may include a standard projector.

In some example embodiments, the lighting and projector fixture 300 includes a mounting frame 304. For example, the recessed projector device 302 may be positioned on the mounting frame 304. To illustrate, the recessed projector device 302 may be positioned on a surface 306 of the mounting frame 304. The mounting frame 304 is designed to be positioned on a ceiling 310 or behind the ceiling 310, wherein the recessed projector device 302 is positioned on the mounting frame 304 on an opposite side from the ceiling 310.

In some example embodiments, the mounting frame 304 may have an opening 308. For example, the opening 308 may be aligned with an opening 332 in the ceiling 310. The recessed projector device 302 may be positioned on the mounting frame 304 to project a light or an image 328 through the opening 308 toward a surface 330 (e.g., a table, a floor, etc.) below the ceiling 310 and the recessed projector device 302.

In some example embodiments, the recessed projector device 302 may include a protruding portion 312 that extends into the opening 308. For example, images projected by the recessed projector device 302 may exit the recessed projector device 302 through the protruding portion 312. To illustrate, a lens of the recessed projector device 302 may be positioned in the protruding portion 312. Alternatively, the recessed projector device 302 may be omitted, and a portion of the recessed projector device 302 through which images exit the recessed projector device 302 may be lined up with and may be flush with the opening 308.

In some example embodiments, the recessed projector device 302 may rest on the mounting frame 304 without being secured by a fastener or another device. For example, the recessed projector device 302 may be wide enough to rest on the surface 306 of the mounting frame 304 without tipping over or otherwise becoming misaligned with the opening 308.

In some example embodiments, the lighting and projector fixture 300 may include a receptacle box 304. For example, the receptacle box 314 may be attached to the mounting frame 304 by one or more fasteners or may be integrally formed with the mounting frame 304. The receptacle box may include a power receptacle 316 that is connected to one or more electrical cables inside the receptacle box 314. A plug 322 of a power cord 320 may be plugged into the receptacle 316 to provide power to the recessed projector device 302.

In some example embodiments, the recessed projector device 302 may communicate with other devices and systems wirelessly. For example, the recessed projector device 302 may use a transceiver, such as the transceiver 208, to wireless communicate with other devices, such as control devices and image sources, using, for example, one or more wireless communication standards (e.g., Wi-Fi, Bluetooth, etc.). In some example embodiments, the recessed projector device 302 may communicate with other devices and systems using a wired connection. For example, a communication cable 324 including a connector 326 may be connected to the recessed projector device 302, and the recessed projector device 302 may communicate with other devices and systems via the cable 324 using one or more communication standards (e.g., Ethernet). For example, the cable 324 may be a coax cable, a CAT-5e cable, etc.

In some example embodiments, the mounting frame 304 may be made from sheet metal or another suitable material as can be contemplated by those of ordinary skill in the art with the benefit of this disclosure. For example, the mounting frame 304 may be made by pressing, bending, cutting, etc. a sheet metal.

By placing the recessed projector device 302 behind the ceiling 310, costs associated with suspending a standalone projector may be avoided. Because of the general availability of electrical wiring behind ceilings, the time and effort required to install the recessed projector device 302 can be lower compared to suspended projectors. Placing the recessed projector device 302 behind the ceiling 310 can also result in lower interference with a space and better use of a space compared to suspended and other types of projectors.

In some example embodiments, the lighting and projector fixture 300 may include other components than shown without departing from the scope of this disclosure. In some alternative embodiments, one or more components of the lighting and projector fixture 300 may be omitted or replaced with one or more other components without departing from the scope of this disclosure. For example, the receptacle box 314 may be omitted or replaced, for example, by a junction box. As another example, the plug 322 may be omitted. In some alternative embodiments, the recessed projector device 302 may have a different shape than shown without departing from the scope of this disclosure. In some alternative embodiments, the mounting frame 304 may have another shape than shown without departing from the scope of this disclosure. In some example embodiments, the recessed projector device 302 may be oriented to project the image 328 or a light in different directions than shown without departing from the scope of this disclosure.

Figure 4:
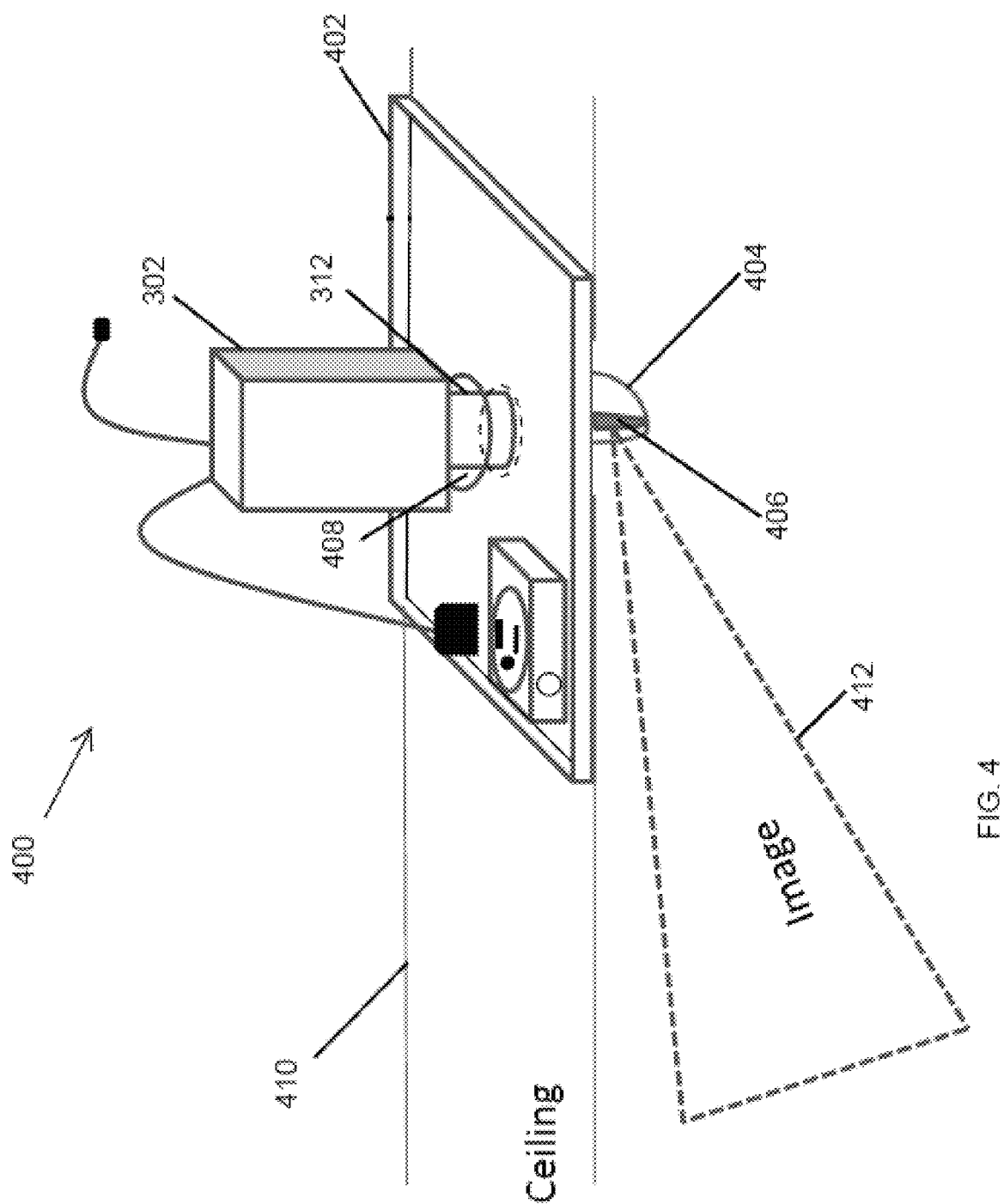
FIG. 4 illustrates a lighting and projector fixture including a recessed projector device according to another example embodiment.

FIG. 4 illustrates a lighting and projector fixture 400 including the recessed projector device 302 according to another example embodiment. In some example embodiments, the lighting and projector fixture 400 may correspond to each of the lighting and projector fixtures 102, 104, 106. In some example embodiments, the lighting and projector fixture 400 includes a mounting frame 402 and a mirror holder 404.

In some example embodiments, the recessed projector device 302 may be positioned on the mounting frame 402 in a similar manner as described with respect to FIG. 3. To illustrate, the recessed projector device 302 may rest on the mounting frame 402 and may be oriented to project an image 412 or a light (e.g., an illumination or a shaped light) through an opening in a ceiling 410. For example, an opening 408 in the mounting frame 402 may be at least partially aligned with the opening in the ceiling 410. The recessed projector device 302 may also be powered and may communicate with other devices in a similar manner as described with respect to FIG. 3.

In some example embodiments, a mirror 406 may be positioned in a cavity of the mirror holder 404. For example, the mirror 406 may be attached to the mirror holder 404 by one or more fasteners such as a glue, a clip, or other means as can be contemplated by those of ordinary skill in the art with the benefit of this disclosure. The mirror 406 may be positioned to reflect the image 412 that is projected by the recessed projector device 302. For example, the mirror 406 may reflect the image 412 to a different surface instead of, for example, the surface 330 that is directly below the recessed projector device 302. In some example embodiments, the mirror 406 may be positioned in the mirror holder 404 to reflect the image 428 up toward a surface of the ceiling 410. In some example embodiments, the mirror 406 may be a convex mirror.

In some example embodiments, the mirror holder 404 may be integrally formed in the mounting frame 402. For example, the mirror holder 404 may extend down through the opening in the ceiling 410. In some example embodiments, the mirror holder 404 may be attached to the mounting frame 402, for example, by one or more fasteners, by soldering, etc. In some example embodiments, the mirror holder 404 may be part of a trim that is attached to the mounting frame 404 or the ceiling 410.

In some example embodiments, the mirror holder 404 may have generally a shape of a half of a dome as illustrated in FIG. 4. Alternatively, the mirror holder 404 may have other shapes without departing from the scope of this disclosure. In some alternative embodiments, the mirror holder 404 may be omitted and the mirror 406 may be attached to the mounting frame 402 by other means without departing from the scope of this disclosure. In some alternative embodiments, the protruding portion 312 may be omitted without departing from the scope of this disclosure. For example, no part of the recessed projector device 302 may extend into the opening 408 in the mounting frame 402. In some example embodiments, the mounting frame 402 may be the mounting frame 304 shown in FIG. 3.

Figure 5:
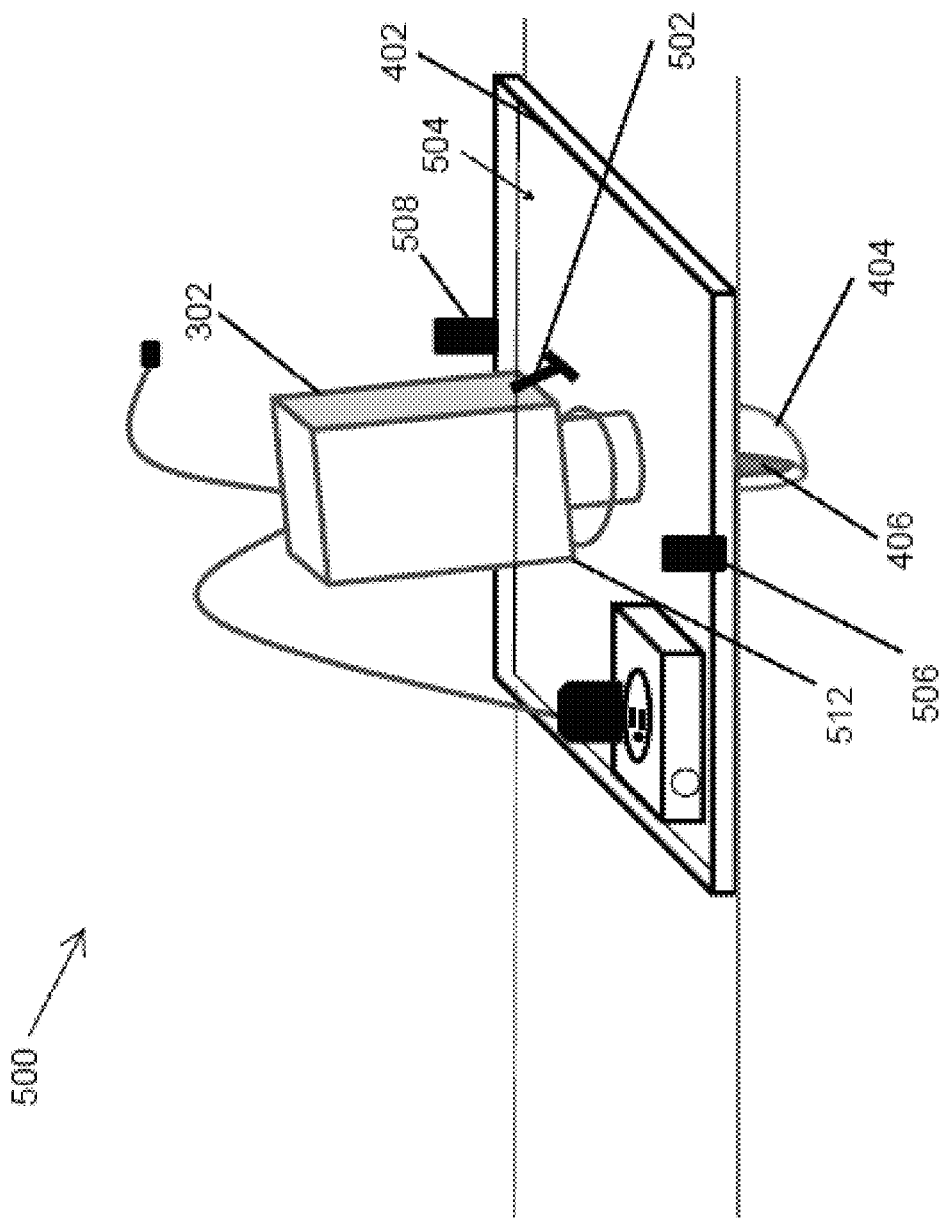
FIG. 5 illustrates a lighting and projector fixture including a recessed projector device according to another example embodiment.

FIG. 5 illustrates a lighting and projector fixture 500 including the recessed projector device 302 according to another example embodiment. Referring to FIGS. 3-5, in some example embodiments, the recessed projector device 302 may be tilted as illustrated in FIG. 5. For example, a support bracket 502 may be attached to the recessed projector device 302 and may hold the recessed projector device 302 lifted above a surface 504 of the mounting frame 402. For example, the support bracket 502 may be secured to the mounting frame 402. Alternatively or in addition, the support bracket 502 may be secured to the recessed projector device 302 by a fastener as can be readily understood by those of ordinary skill in the art with the benefit of this disclosure.

In some example embodiments, an edge 512 of the recessed projector device 302 may rest on the surface 504 of the mounting frame 402 when the recessed projector device 302 is tilted. For example, the support bracket 502 may be attached to the recessed projector device 302 an opposite side from the edge 512.

In some example embodiments, tilting the recessed projector device 302 may enable projection of an image on a different surface or area than otherwise possible. In some example embodiments, tilting the recessed projector device 302 may provide additional flexibility in the positioning of the mirror 406 in the mirror holder 404. In some example embodiments, tilting the recessed projector device 302 may allow use of a less expensive mirror.

In some example embodiments, mounting brackets 506, 508 that are attached to the mounting frame 402 on opposite sides from each other may be used to attach the mounting frame 402 to ceiling structures such as joists. For example, the mounting brackets 506, 508 may protrude up from the mounting frame 402 and may be fastened to parallel structures above the ceiling 410. In some alternative embodiments, the mounting frame 402 may rest on the ceiling 410 or may be attached by other means.

In some example embodiments, a different support bracket than the support bracket 502 may be used to tilt or otherwise orient the recessed projector device 302 without departing from the scope of this disclosure. In some example embodiments, a second bracket may be used to provide a different tilting angle. In some alternative embodiments, a different type of structure than the support bracket 502 may be used without departing from the scope of this disclosure.

Figure 6:
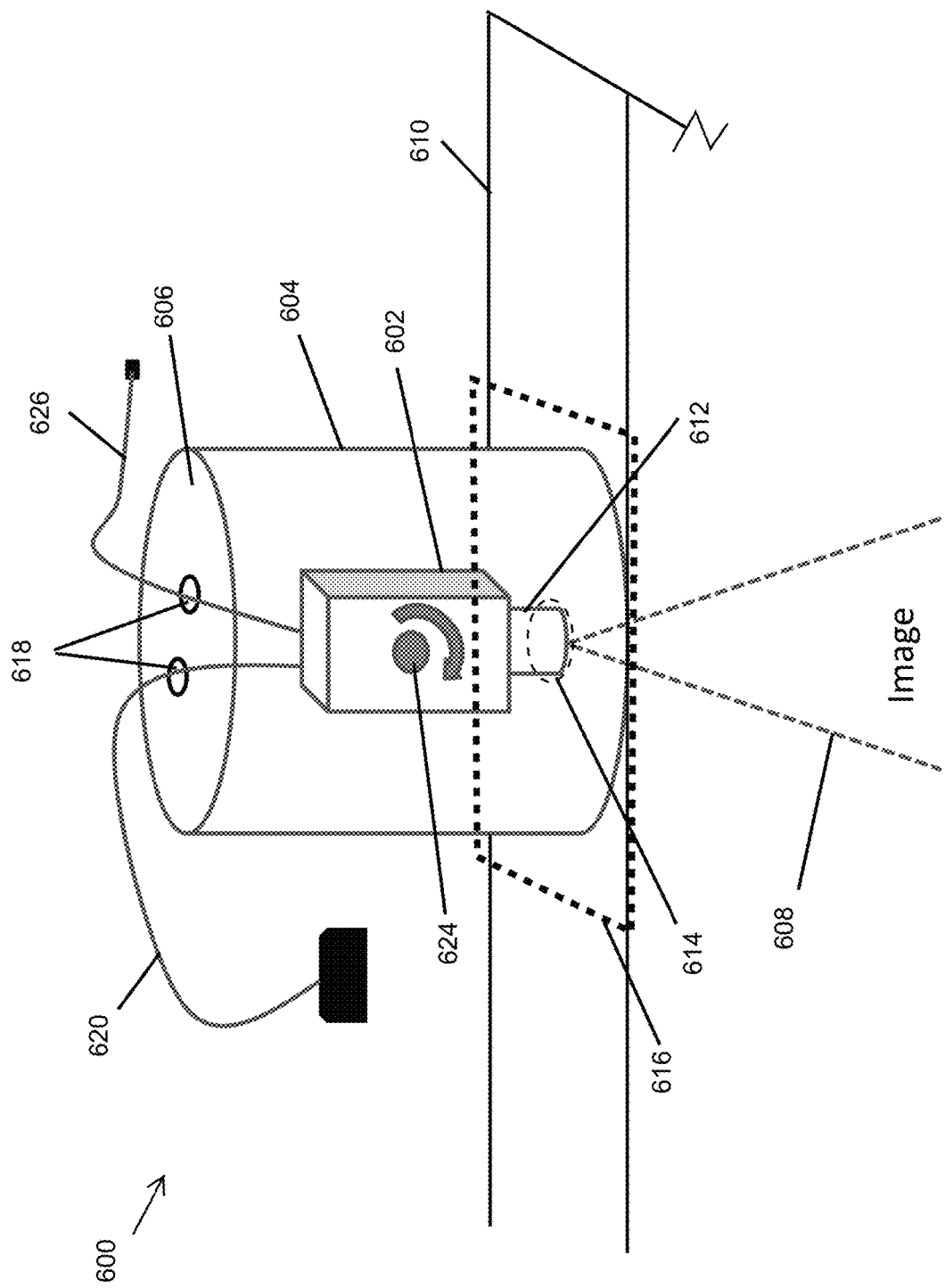
FIG. 6 illustrates a lighting and projector fixture including a recessed projector device inside a housing can according to an example embodiment.

FIG. 6 illustrates a lighting and projector fixture 600 including a recessed projector device 602 inside a housing can 604 according to an example embodiment. In some example embodiments, the recessed projector device 602 may correspond to the lighting and projector device 200 shown in FIG. 2. In some example embodiments, the recessed projector device 602 may correspond to or may include a standard projector.

In some example embodiments, the recessed projector device 602 and the housing can 604 are positioned behind a ceiling 610. The recessed projector device 602 may be positioned in the housing can 604 such that the recessed projector device 602 can project an image 608 or a light through an opening 614 in the ceiling 610. For example, a protruding portion 612 of the recessed projector device 602 may be at least partially aligned with the opening 614 in the ceiling 610 such that the image 608 passing through the protruding portion 612 passes through the opening 614 toward a surface below the ceiling 610 and the recessed projector device 602.

In some example embodiments, the recessed projector device 602 is attached to the housing can 604 at attachment point 624 of the recessed projector device 602. For example, the recessed projector device 602 may be attached to the housing 102 by one or more fasteners, such as screws. In some example embodiments, the recessed projector device 602 may be rotatable about the attachment point 124 to orient the recessed projector device 602 after being securely attached to the housing can 604. In some alternative embodiments, the recessed projector device 602 may be non-rotatably attached to the housing can 604. In some example embodiments, the recessed projector device 602 may be attached to the housing can 604 using fasteners or torsion springs described below.

In some example embodiments, the housing can 604 is shown as having a cylindrical shape but may have another shape without departing from the scope of this disclosure. In some example embodiments, the housing can 604 may also have a top wall 606 having one or more openings 618. For example, a power cord 620 attached to the recessed projector device 602 may pass through one of the openings 618, and a communication cable 626 attached to the recessed projector device 602 may pass through the same or a different one of the openings 618. In some example embodiments, the openings 618 and/or other openings in the cylindrical portion or the top wall 606 of the housing can 604 may allow for heat generated by the recessed projector device 602 to exit the housing can 604.

In some example embodiments, the housing can 604 may be attached to a mounting structure 616. For example, the mounting structure 616 may be positioned on or above the ceiling 610 to ease installation of the lighting and projector fixture 600. The mounting structure 616 may be positioned such the mounting structure 616 does not block the lower opening of the housing can 604. The housing can 604 may be attached to a mounting structure 616 by one or more fasteners as may be contemplated by those of ordinary skill in the art with the benefit of this disclosure.

In some example embodiments, the housing can 604 and the mounting structure 616, when present, may be formed from sheet metal using methods such as stamping, bending, etc. In some example embodiments, the recessed projector device 602 may be the same as the recessed projector device 302 and/or may operate in a similar manner as the recessed projector device 302. In some example embodiments, the recessed projector device 602 may not include the protruding portion 612 or another protruding portion, and the image 608 may be projected by the recessed projector device 602 from a non-protruding portion that is aligned with the opening 614. In some example embodiments, the mounting structure 616 may be omitted without departing from the scope of this disclosure.

Figure 7:
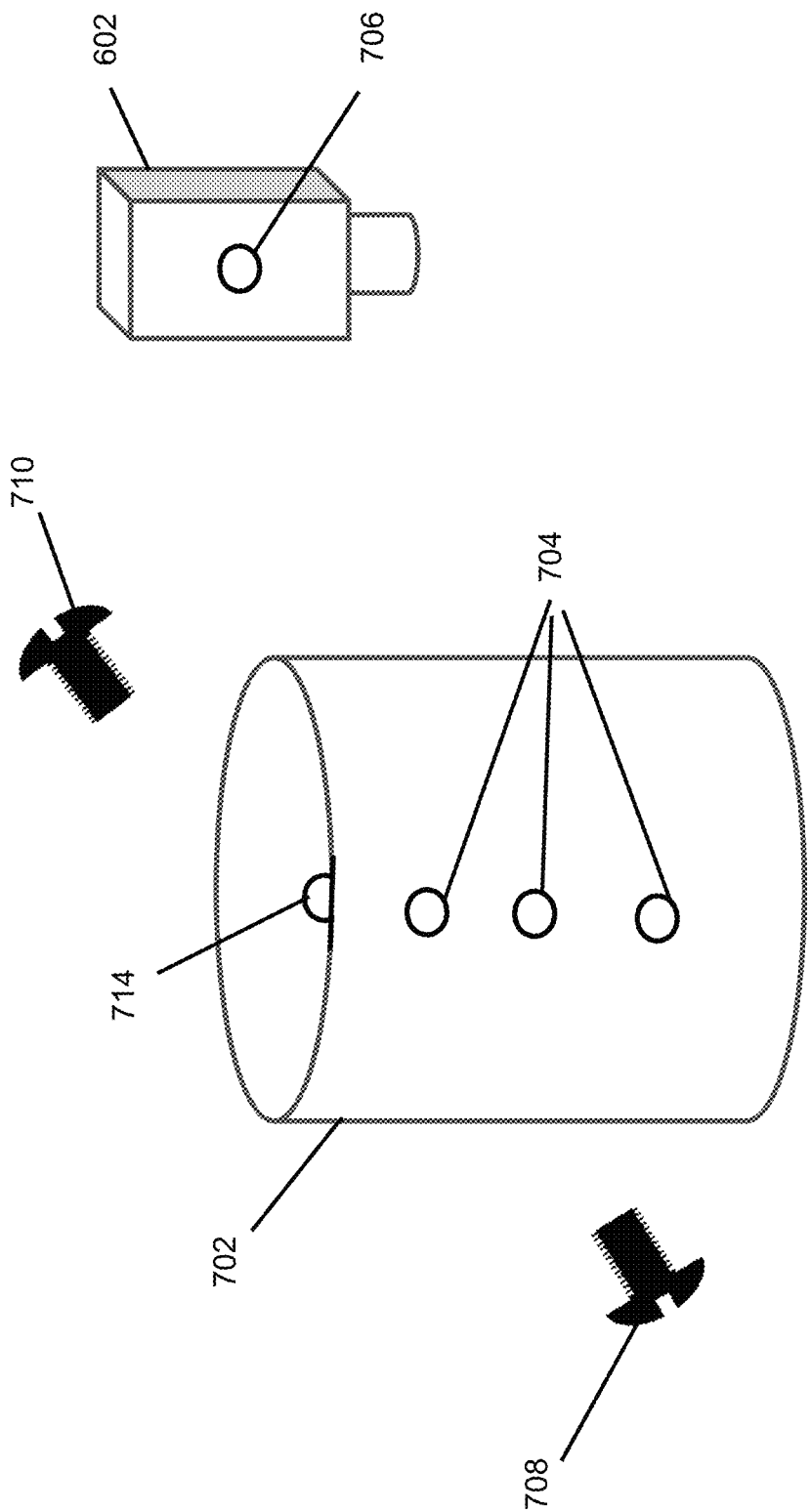
FIG. 7 illustrates a housing can for a recessed projector device according to an example embodiment

FIG. 7 illustrates the housing can 702 for the recessed projector device 602 according to an example embodiment. In some example embodiments, the housing can 702 includes one or more attachment holes 704 that are across from one or more other attachment holes 714. Fasteners 708, 710 may be used to attach the recessed projector device 602 to the housing can 702. For example, the fastener 708 may extend through one of the holes 704 and may be inserted into a threaded hole 706 of the recessed projector device 602, and the fastener 710 may extend through one of the holes 714 and may be inserted into a threaded hole on the opposite side of the recessed projector device 602. In some example embodiments, one of the holes 704, 714 on each side of the housing can 702 may be used depending on the desired position of the recessed projector device 602 inside the housing can 702.

In some example embodiments, the housing can 702 may be open both on the top and bottom sides of the housing can 702. In some alternative embodiments, the housing can 702 may be open on the bottom side and may have a top wall such as the top wall 606 of the housing can 604 shown in FIG. 6. In some example embodiments, the housing can 702 may have just one attachment hole on each side. In some alternative embodiments, the housing can 702 may have another shape than shown without departing from the scope of this disclosure. In some example embodiments, the housing can 702 may be made from sheet metal using methods such as stamping, bending, etc.

FIG. 8 illustrates a housing can 802 for a recessed projector device according to another example embodiment. In some example embodiments, torsion springs 804, 806 may be used to attach the recessed projector device 602 to the housing can 802. For example, the torsion spring 804 may be attached to the recessed projector device 602 on a one side, and the torsion spring 806 may be attached to the recessed projector device 602 on an opposite side. To illustrate, the torsion springs 804, 806 may be attached to fasteners (e.g., screws) that are attached to the recessed projector device 602.

In some example embodiments, the housing can 802 may include one or more torsion spring receivers 808, 810 on each side of the housing can 802, and the torsion springs 804, 806 may be attached to the torsions spring receivers 808, 810. Particular ones of the torsion spring receivers 808, 810 on each side of the housing can 802 may be used depending on the desired position of the recessed projector device 602 inside the housing can 802.

In some example embodiments, the housing can 802 may be open both on the top and bottom sides of the housing can 802. In some alternative embodiments, the housing can 802 may be open on the bottom side and may have a top wall such as the top wall 606 of the can 604 shown in FIG. 6. In some example embodiments, the housing can 802 may have just one torsion spring receiver. In some alternative embodiments, the housing can 802 may have another shape than shown without departing from the scope of this disclosure. In some example embodiments, the housing can 802 may be made from sheet metal using methods such as stamping, bending, etc.

Figure 9:
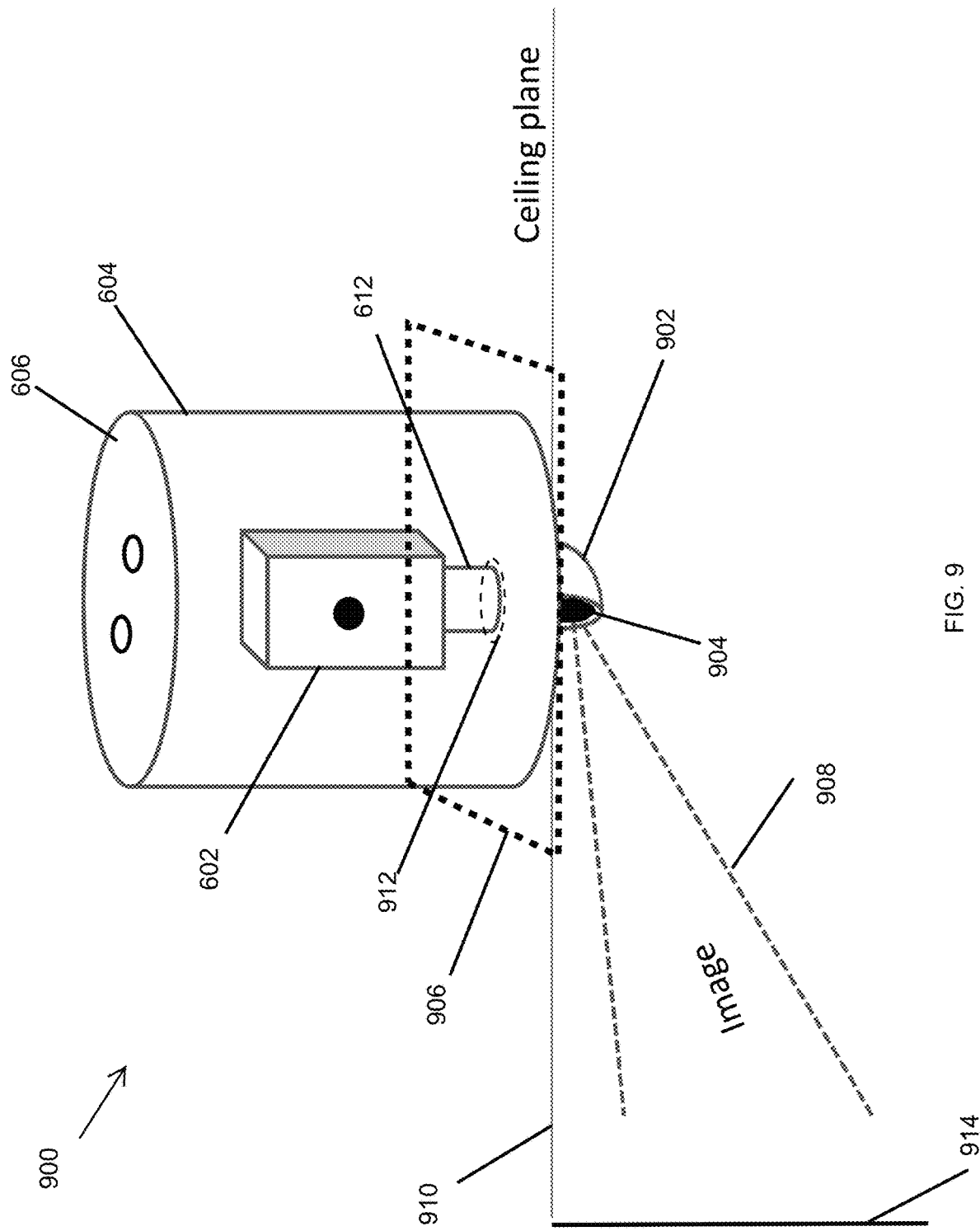
FIG. 9 illustrates a lighting and projector fixture including a recessed projector device inside a housing can according to another example embodiment.

FIG. 9 illustrates a lighting and projector fixture 900 including the recessed projector device 602 inside the housing can 604 according to another example embodiment. In some example embodiments, the recessed projector device 602 and the housing can 604 may be positioned behind a ceiling 910 to project an image 908 or a light (e.g., an illumination or a shaped light) to a surface below the ceiling 910. The recessed projector device 602 may be attached to the housing can 604 in a manner described above with respect to FIGS. 6-8. The recessed projector device 602 may be powered and may communicate with other devices in a similar manner as described with respect to the recessed projector device 302 of FIG. 3 and with respect to FIG. 6.

In some example embodiments, the lighting and projector fixture 900 is substantially similar to the lighting and projector fixture 600 of FIG. 6. Focusing on the main differences, in some example embodiments, the lighting and projector fixture 900 includes a mirror holder 902 holding a mirror 904 that may be attached to the mirror holder 902 by an adhesive, one or more clips, or by other means as can be contemplated by those of ordinary skill in the art with the benefit of this disclosure. The mirror 904 may be positioned in a cavity of the mirror holder 902 to reflect the image 908 or a light that is projected by the recessed projector device 602 to a different surface. To illustrate, the mirror 904 may reflect the image 908 toward a surface of a wall 914 instead of a table or a floor directly below the recessed projector device 602. In some example embodiments, the mirror 904 may be positioned in the mirror holder 902 to reflect the image 908 up toward a surface of the ceiling 910. In some example embodiments, the mirror 904 may be a convex mirror.

In some example embodiments, the mirror holder 902 may be attached to the ceiling 910. Alternatively or in addition, the mirror holder 902 may be attached to the housing can 604 and may extend through the opening 912 in the ceiling 910. In some example embodiments, the mirror holder 902 may be part of a trim that is attached to the ceiling 910 and/or the housing can 604.

In some example embodiments, the mirror holder 902 may have a shape of a half of a dome as illustrated in FIG. 9. Alternatively, the mirror holder 902 may have other shapes without departing from the scope of this disclosure. In some alternative embodiments, the mirror holder 902 may be omitted and the mirror 904 may be attached to the ceiling 910 or the housing can 604 by other means without departing from the scope of this disclosure. In some alternative embodiments, the protruding portion 612 may be omitted without departing from the scope of this disclosure. For example, no part of the recessed projector device 602 may extend into the opening 912 in the ceiling 910. In some example embodiments, the mirror holder 902 may be attached to or may be integrally formed with the mounting structure 906, which generally corresponds to the mounting structure 616 shown in FIG. 6. In some alternative embodiments, the housing can 604 may have a fully or substantially open top end without departing from the scope of this disclosure.

Figure 10:
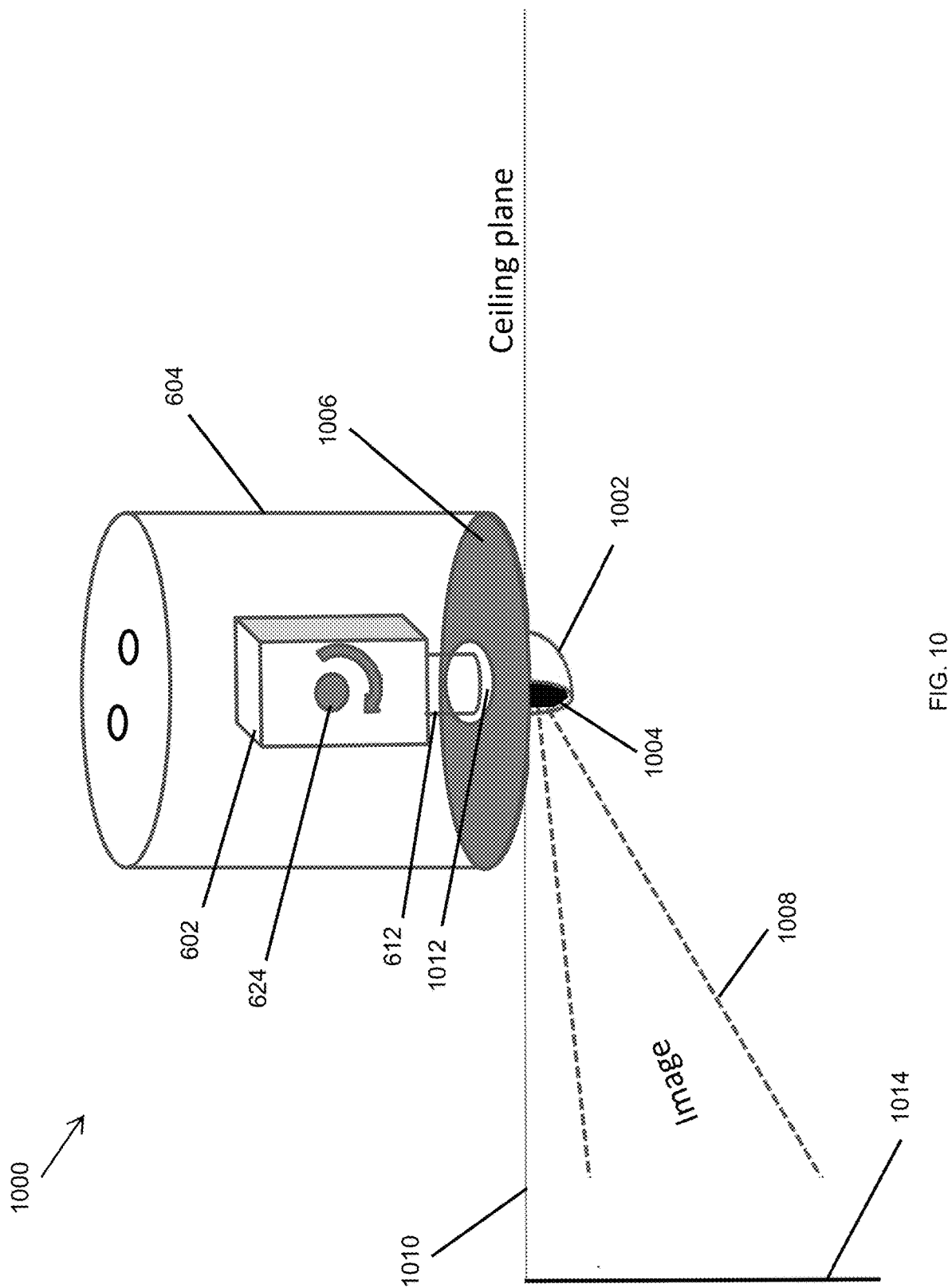
FIG. 10 illustrates a lighting and projector fixture including a recessed projector device inside a housing can according to another example embodiment.

FIG. 10 illustrates a lighting and projector fixture 1000 including a recessed projector device 602 inside a housing can 604 according to another example embodiment. In some example embodiments, the recessed projector device 602 and the housing can 604 may be positioned behind a ceiling 1010, and the recessed projector device 602 may be oriented to project an image 1008 or a light (e.g., an illumination or a shaped light) to a surface below the ceiling 1010. The recessed projector device 602 may be attached to the housing can 604 in a manner described above with respect to FIGS. 6-9. The recessed projector device 602 may be powered and may communicate with other devices in a similar manner as described with respect to the recessed projector device 302 of FIG. 3 and with respect to FIGS. 6 and 9.

In some example embodiments, the lighting and projector fixture 1000 is substantially similar to the lighting and projector fixture 600 of FIG. 6 and the lighting and projector fixture 900 of FIG. 9. Focusing on the main differences, in some example embodiments, the lighting and projector fixture 1000 includes a mirror holder 1002 holding a mirror 1004, and a trim 1006 attached to the housing can 604. In some example embodiments, the trim 1006 may include the mirror holder 1002, or the trim 1006 may be a separate structure from the mirror holder 1002. In some example embodiments, the mirror holder 1002 may be attached to the ceiling 1010. The mirror 1004 may be attached to the mirror holder 1002 by one or more fasteners, such as a glue, a clip, or other means as can be contemplated by those of ordinary skill in the art with the benefit of this disclosure.

In some example embodiments, the trim 1006 may have an opening 1012 that is at least partially aligned with an opening in the ceiling 1010 such that the image 1008 projected by the recessed projector device 602 reaches the mirror 1004 positioned in the mirror holder 1002. The mirror 1004 may be positioned in a cavity of the mirror holder 1002 to reflect the image 1008 or a light that is projected by the recessed projector device 602 toward a surface, such as a surface of a wall 1014. In some example embodiments, the mirror 1004 may be positioned in the mirror holder 1002 to reflect the image 1008 up toward a surface of the ceiling 1010. In some example embodiments, the mirror 1004 may be a convex mirror.

FIGS. 11A-11D illustrate trims of lighting and projector fixtures according to example embodiments. For example, a trim 1100 shown in FIG. 11A may be used in the lighting and projector fixtures of FIGS. 3 and 6. The trims 1102-1106 may be used in the fixtures of FIGS. 4, 5, 9, and 10. For example, a mirror holder 1110 of the trim 1102 may hold a mirror 1112 as shown in FIG. 11B. As another example, as shown in FIG. 11C, a mirror holder 1114 of the trim 1104 may hold a mirror in a cavity 1116 to reflect an image directed to the mirror from a projector device such as the projector devices 302, 602 described above. In some example embodiments, a mirror holder 1118 of the trim 1106 shown in FIG. 11D may hold a mirror that is positioned to reflect an image or a light directed to the mirror from a projector device such as the projector devices 302, 602 described above.

Figure 12:
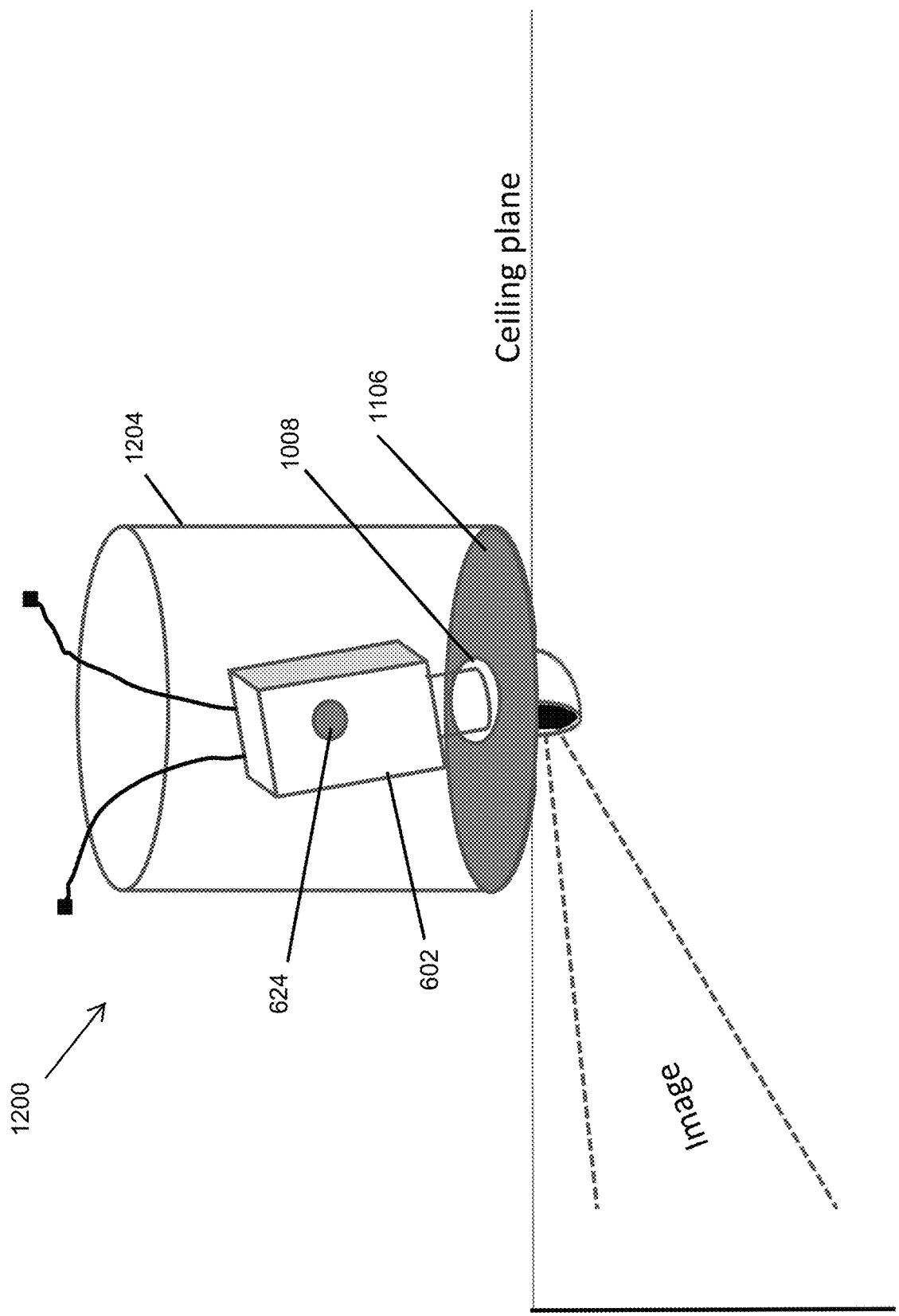
FIG. 12 illustrates a lighting and projector fixture including a recessed projector device inside a housing can according to another example embodiment.

FIG. 12 illustrates a lighting and projector fixture 1200 including the recessed projector device 602 inside the housing can 1204 according to another example embodiment. In some example embodiments, the lighting and projector fixture 1200 is substantially similar to the lighting and projector fixture 1000 of FIG. 10. Focusing on the main differences, in some example embodiments, the housing can 1204 is fully open at the top end in contrast to the housing can 604 of FIG. 10 that has a top wall having openings for routing wires and for dissipating heat. In some example embodiments, in FIG. 12, the recessed projector device 602 may also be rotated in contrast to the position of the recessed projector device 602 in FIG. 10.

In some example embodiments, positioning the recessed projector device 602 in the rotated position shown in FIG. 12 may enable the projection of an image or a light by the lighting and projector fixture 1200 on a particular surface or area. In some example embodiments, rotating the recessed projector device 602 as shown may provide additional flexibility in the positioning of a mirror positioned in a mirror holder below the recessed projector device 602.

Figure 13:
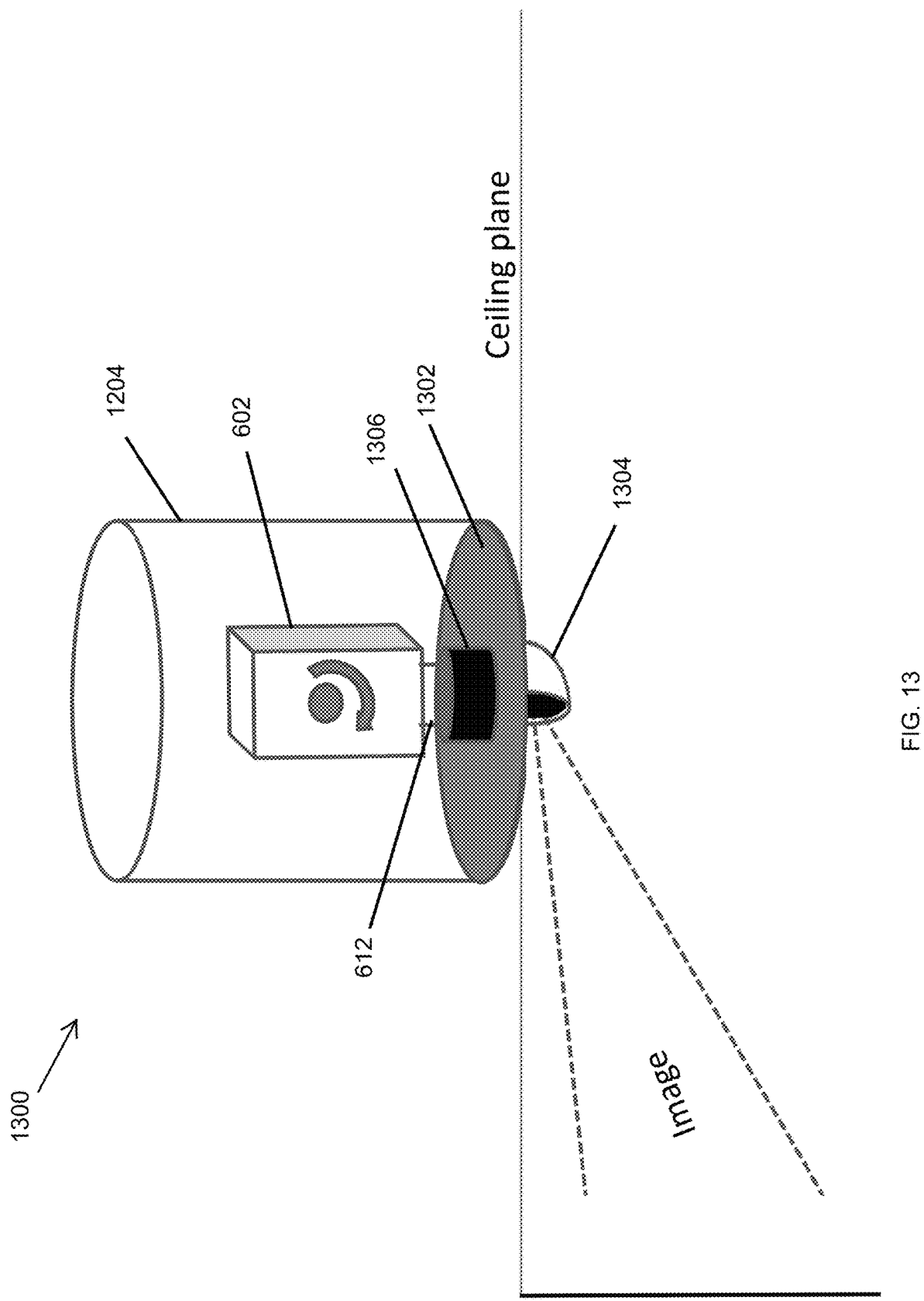
FIG. 13 illustrates a lighting and projector fixture including a recessed projector device inside a housing can according to another example embodiment.

FIG. 13 illustrates a lighting and projector fixture 1300 including the recessed projector device 602 inside a housing can 1204 according to another example embodiment. In some example embodiments, the lighting and projector fixture 1300 is substantially similar to the lighting and projector fixture 1000 of FIG. 10. Focusing on the main differences, in some example embodiments, the housing can 1204 is fully open at the top end in contrast to the housing can 604 of FIG. 10 that has a top wall having openings for routing wires and for dissipating heat. In some example embodiments, in FIG. 13, a trim 1302 having a cylindrical portion 1306 may be attached to the housing can 1204. For example, the protruding portion of the recessed projector device 602 may be aligned with the cylindrical portion 1306 or may be at least partially positioned in the cylindrical portion 1306.

Figure 14:
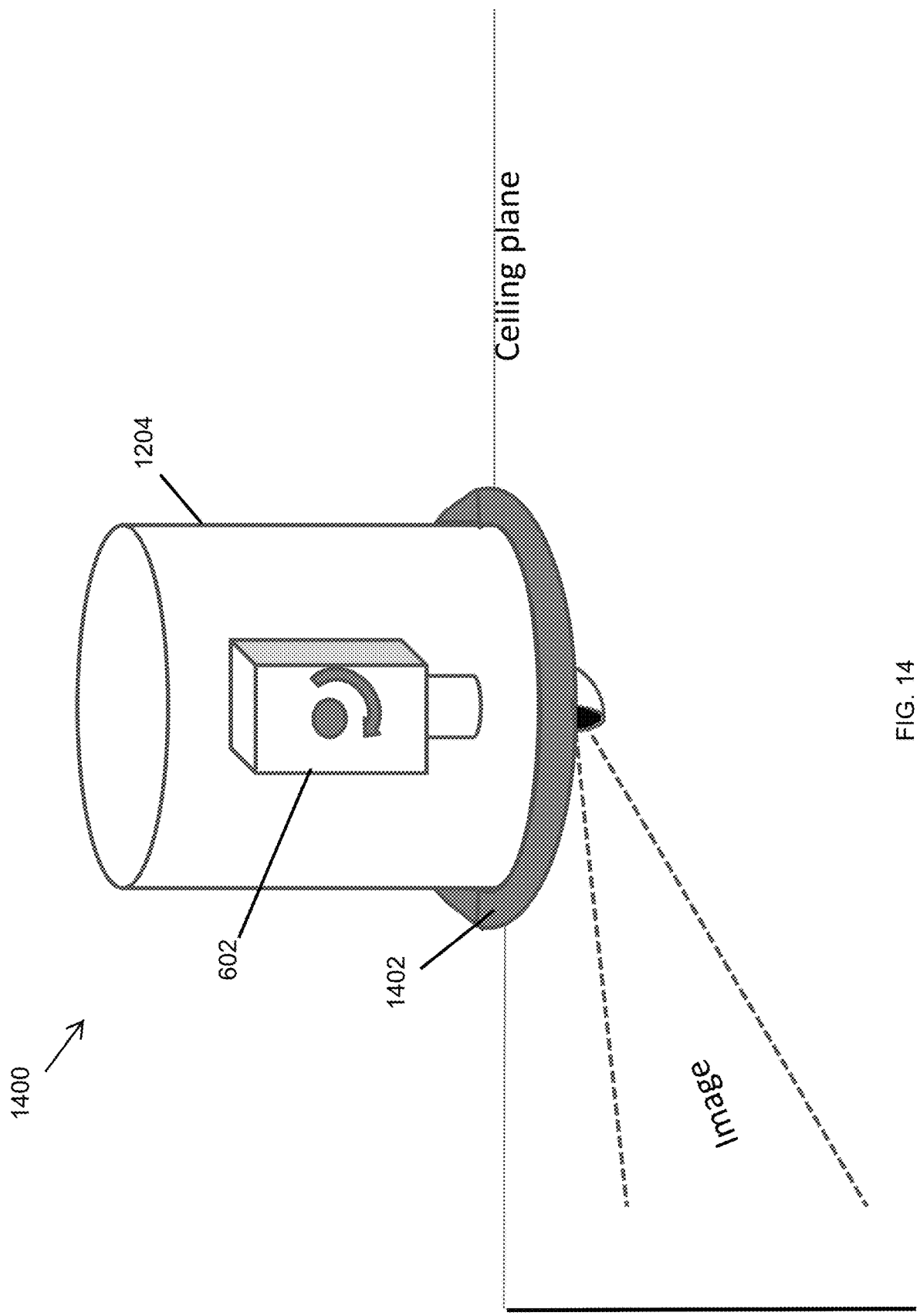
FIG. 14 illustrates a lighting and projector fixture including a recessed projector device inside a housing can according to another example embodiment.

FIG. 14 illustrates a lighting and projector fixture 1400 including the recessed projector device 602 inside the housing can 1204 according to another example embodiment. In some example embodiments, the lighting and projector fixture 1400 is substantially similar to the lighting and projector fixture 1000 of FIG. 10. Focusing on the main differences, in some example embodiments, the housing can 1204 is fully open at the top end in contrast to the housing can 604 of FIG. 10 that has a top wall having openings for routing wires and for dissipating heat. In some example embodiments, in FIG. 14, a trim 1402 is positioned around the perimeter of the housing can 1204 in contrast to the trim 1006 shown in FIG. 10 that may be positioned inside or aligned with the perimeter of the housing can 604.

Figure 15A:
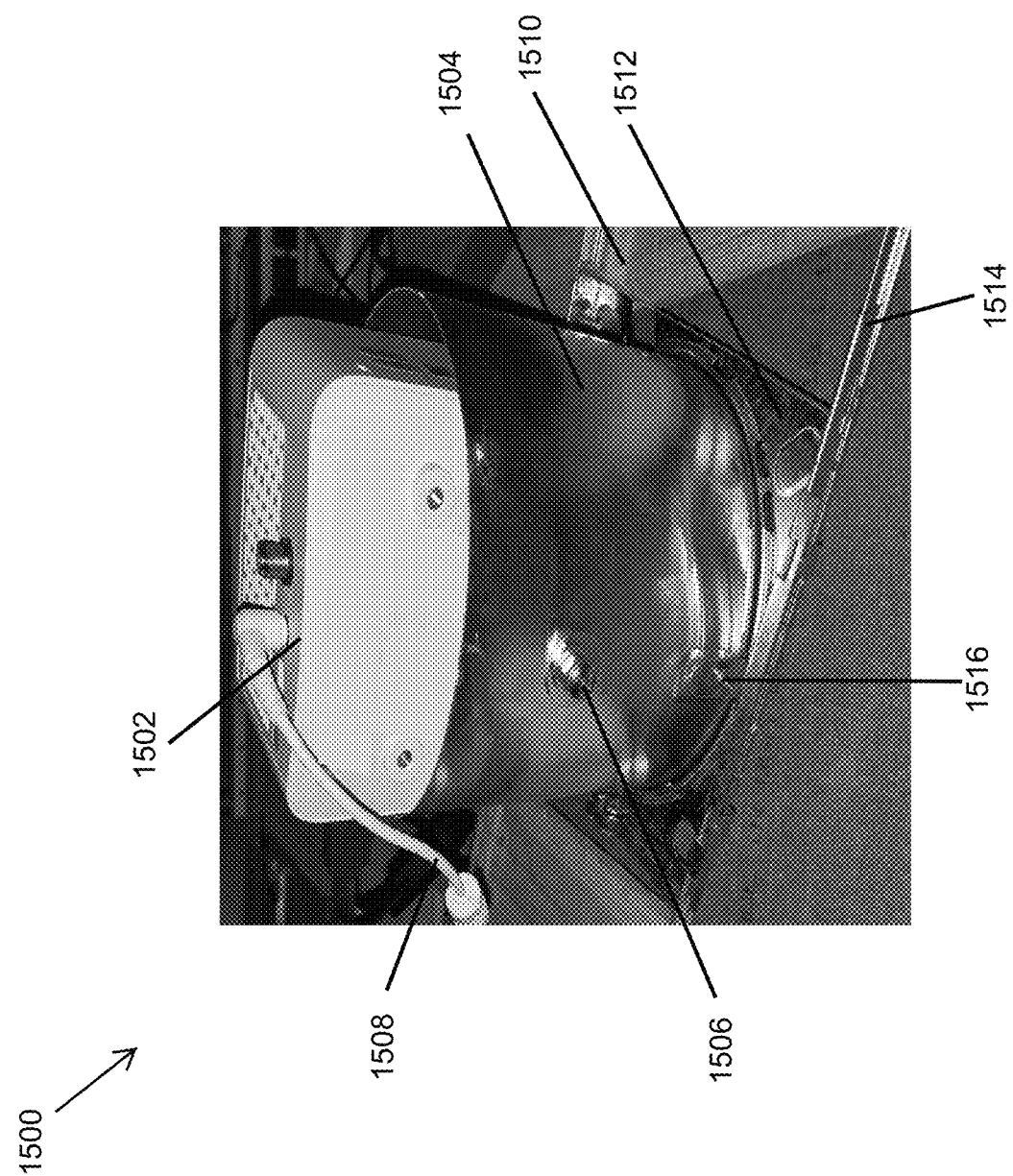
FIGS. 15A and 15B illustrate a lighting and projector fixture recessed behind a ceiling according to another example embodiment.
Figure 15B:
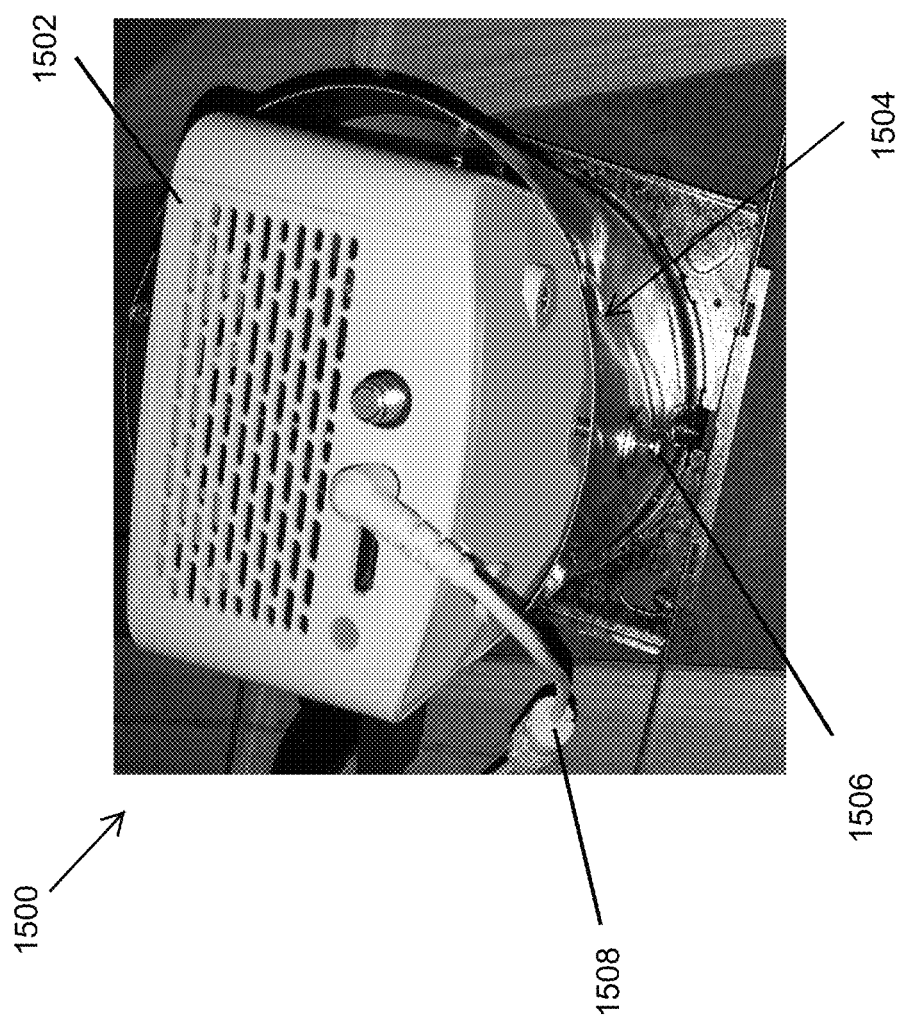

FIGS. 15A and 15B illustrate a lighting and projector fixture 1500 including a projector device 1502 recessed behind a ceiling 1510 according to another example embodiment. In some example embodiments, the fixture 1500 includes the projector device 1502 positioned in a housing can 1504. The housing can 1504 may be attached to a mounting structure 1512 by fasteners, such as a fastener 1516. In some example embodiments, fasteners such as a fastener 1506 may be used to attach the projector device 1502 to the housing can 1504.

In some example embodiments, the mounting structure 1512 may rest on the ceiling 1510. Alternatively or in addition, the mounting structure 1512 may be attached to hanger bars, such as the hanger bar 1514, that may be used to attach the mounting structure 1512 to structures such as joists behind the ceiling 1510.

In some example embodiments, the projector device 1502 may communicate with other devices, such as control devices (e.g., a mobile device, a controller, etc.) and image sources (e.g., a video camera, a cloud server, etc.), using a cable 1508. For example, the cable 1508 may be coupled to a network device or another device such as a laptop, etc. One or more wires may be used to provide power to the projector device 1502 without the need for the wires to extend below the ceiling 1510.

Figure 16:
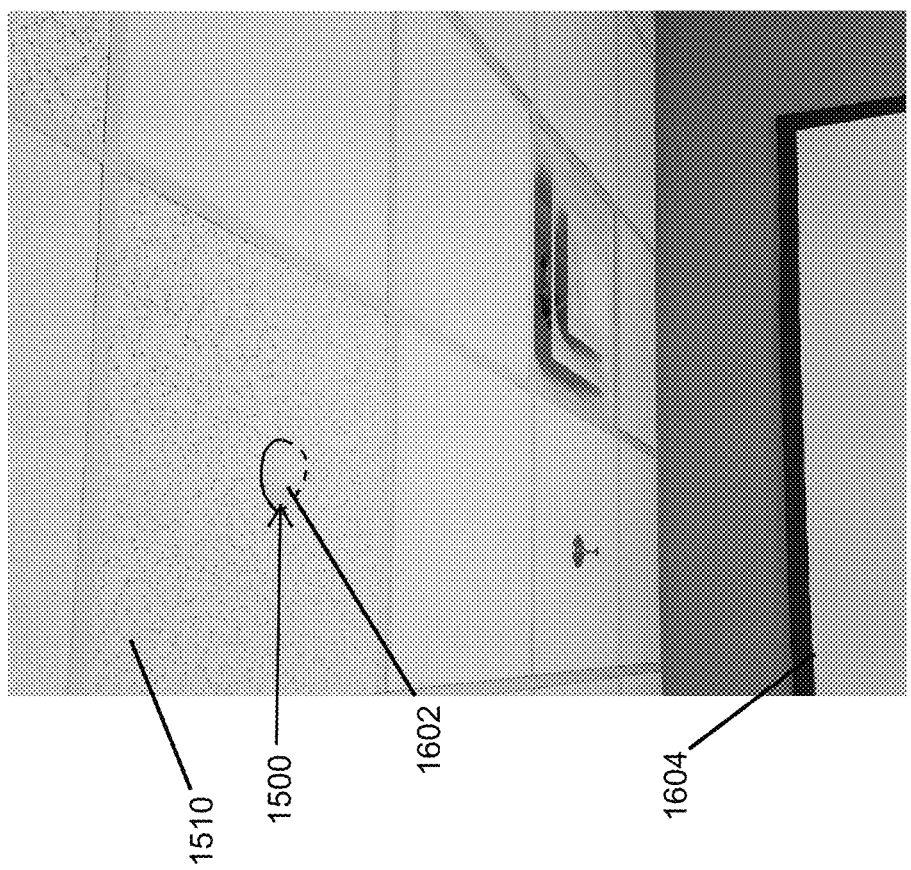
FIG. 16 illustrates the lighting and projector fixture of FIGS. 15A and 15B from below a ceiling according to another example embodiment.

FIG. 16 illustrates the lighting and projector fixture 1500 of FIGS. 15A and 15B from below a ceiling according to another example embodiment. Referring to FIGS. 15A, 15B, and 16, the lighting and projector fixture 1500 may include a mirror holder 1602 that holds a mirror similar to the mirrors described above. For example, the mirror may be positioned in the mirror holder 1602 to reflect an image or a light from the projector device 1502 toward the screen 1604 that is below the ceiling 1510. The mirror holder 1602 may be a standalone structure or may be part of another structure, such as a trim, as described above.

As can be seen in FIG. 16, the lighting and projector fixture 1500 requires a relatively small space in the side of the ceiling 1510 facing occupants, and thus, eliminates or reduces the interference that traditionally results from suspended or desktop projectors.

Figure 17:
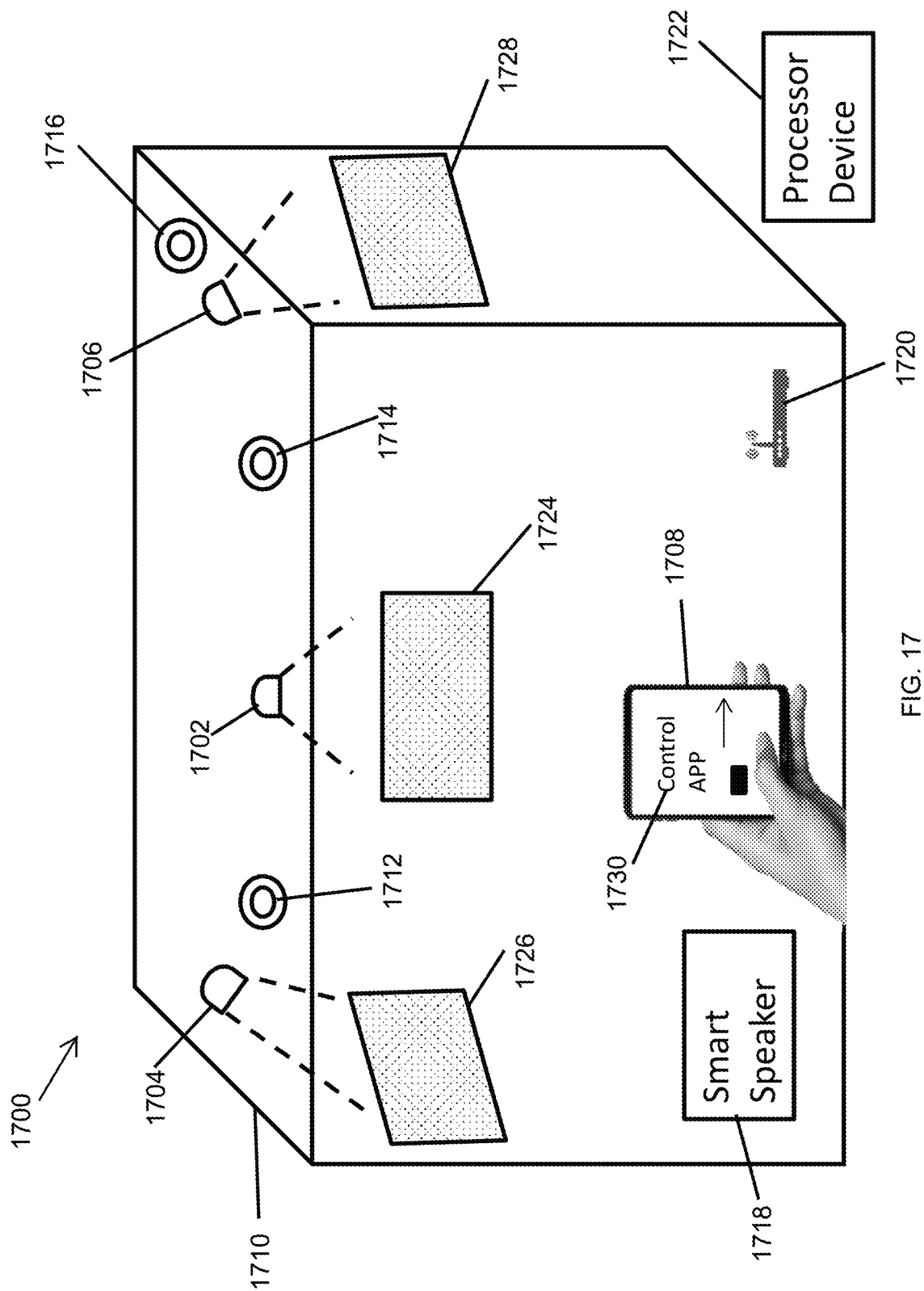
FIG. 17 illustrates a lighting and projector system including recessed projector devices according to another example embodiment.

FIG. 17 illustrates a lighting and projector system 1700 including recessed projector devices according to another example embodiment. For example, the lighting and projector system 1700 may be similar to the system 100 of FIG. 1 and may operate in a substantially similar manner.

In some example embodiments, the system 1700 includes recessed projector devices 1702, 1704, 1706. For example, the recessed projector devices 1702, 1704, 1706 may each be one of the recessed lighting and projector fixtures (e.g., the fixture 400, the fixture 500, the fixture 900, etc.) described above and may be installed in a ceiling 1710 in a similar manner as described above. In some example embodiments, the recessed projector devices 1702, 1704, 1706 may be recessed in the ceiling 1710 and may be controllable by one or more control devices, such as a handheld device 1708, a smart speaker 1718, external or integrated occupancy sensors, etc.

In some example embodiments, lighting fixtures 1712, 1714, 1716 may be installed in the ceiling 1710. The lighting fixtures 1712, 1714, 1716 may each wired and/or wireless communication capability. For example, the lighting fixtures 1712, 1714, 1716 may be controllable by a control device, such as the handheld device 1708, the smart speaker 1718, external or integrated occupancy sensors, etc.

In some example embodiments, the handheld device 1708 may wirelessly communicate with the recessed projector devices 1702, 1704, 1706 and the lighting fixtures 1712, 1714, 1716 using one or more communication standards such as Wi-Fi, BLE, ZigBee, etc. For example, the handheld device 1708 may communicate with the recessed projector devices 1702, 1704, 1706 through a network device 1720 that may include a wired and/or wireless router, a gateway device for communication with the internet including cloud servers, etc.

In some example embodiments, a processor device 1722 may control operations of the projector devices 1702, 1704, 1706, for example, based on communications with the handheld device 1708, the smart speaker 1718, external or integrated occupancy sensors as well as the projector devices 1702, 1704, 1706. For example, the processor device 1722 may be a local server that serves as a central controller that communicates with the handheld device 1708, the smart speaker 1718, external or integrated occupancy sensors, and the projector devices 1702, 1704, 1706 via the network device 1720. Alternatively, the processor device 1722 may be a remote cloud server that communicates with the handheld device 1708, the smart speaker 1718, external or integrated occupancy sensors, and the projector devices 1702, 1704, 1706 through the network device 1720 and that operates in a similar manner as a local server. The processor device 1722 may communicate with and control operations of the lighting fixtures 1712, 1714, 1716 in a similar manner.

In some example embodiments, the recessed projector device 1702 is positioned to project an image or a light (e.g., a shaped light) on a surface 1724. The recessed projector device 1704 may be positioned to project an image or a light (e.g., a shaped light) on a surface 1726, and the recessed projector device 1706 is positioned to project an image or a light (e.g., a shaped light) on a surface 1728. In some example embodiments, the projector devices 1702, 1704, 1706 may each have a network address or identifier that can be used by other devices to communicate with the projector devices 1702, 1704, 1706. In some example embodiments, the lighting fixtures 1712, 1714, 1716 may also have network addresses or identifiers.

In some example embodiments, the handheld device 1708 (e.g., a mobile phone or a tablet) may include a control application 1730 that is executed by the handheld device 1708 to control operations of the projector devices 1702, 1704, 1706. For example, the control application 1730 may be configured, automatically or through a manual process, with the network addresses of the projector devices 1702, 1704, 1706 as can be readily understood by those of ordinary skill in the art with the benefit of this disclosure.

In some example embodiments, a user may select a particular one of the projector devices 1702, 1704, 1706 using the control application 1730. For example, the control application 1730 may provide a drop-down menu or otherwise provide a list of the projector devices 1702, 1704, 1706 on the display screen of the handheld device 1708. The control application 1730 may provide input interfaces for use by a user to power on or off one or more of the projector devices 1702, 1704, 1706. The control application 1730 may also provide an input interface on the display screen of the handheld device 1708 to select casting of images from the handheld device 1708 to one or more of the projector devices 1702, 1704, 1706.

In some example embodiments, the handheld device 1708 may associate one or more network addresses of the projector devices 1702, 1704, 1706 with particular user inputs. For example, a user may configure the control application 1730 to make such associations. Alternatively or in addition, a user may update a default association of particular user inputs with network addresses of the projector devices 1702, 1704, 1706. For example, the control application 1730 may associate a swipe (e.g., using a finger or a stylus) of the touch-sensitive display screen toward a particular side (e.g., right side) of the display screen with a command for particular one or more of the projector devices 1702, 1704, 1706 to project one or more images. In response to such a swipe of the display screen, the handheld device 1708 may transmit the command to the particular one or more of the projector devices 1702, 1704, 1706.

To illustrate, the projector device 1702 may be associated with a swipe to the top side of the handheld device 1708 (and, thus the top side of the display screen), and the handheld device 1708 may transmit a command to the projector device 1702 to project an image or a light. The projector device 1704 may be associated with a swipe to the left side of the handheld device 1708 in a similar manner, and the projector device 1706 may be associated with a swipe to the right side of the handheld device 1708 in a similar manner. Additional projector devices may be associated with swipes to particular corners of the handheld device 1708. In some alternative embodiments, more directionally specific swipes of the display screen of the handheld device 1708 may be associated with commands to the projector devices 1702, 1704, 1706. In some example embodiments, two same-direction swipes may result in one or more of the projector devices 1702, 1704, 1706 starting to project an image or a light in response to the first swipe and stopping the projection of the image in response to the second swipe. Two same-direction swipes may also result in one or more of the projector devices 1702, 1704, 1706 stopping the projection of an image or a light in response to the first swipe and starting to project an image or a light in response to the second swipe.

In some example embodiments, a particular swipe or user input may be associated with multiple or all projector devices of the lighting and projector system 1700 and may result in multiple or all of the projector devices 1702, 1704, 1706 projecting one or more images or stopping the projection of one or more images. In some example embodiments, the handheld device 1708 may send a command to a different one of the projector devices 1702, 1704, 1706 to project an image in response to a particular user input (e.g., a down swipe), where the handheld device 1708 sequences through the projector devices 1702, 1704, 1706.

In some example embodiments, a user input (e.g., a swipe) to select one or more of the projector devices 1702, 1704, 1706 to project one or more images may result in the handheld device 1708 sending one or more commands to the unselected ones of the projector devices 1702, 1704, 1706 to stop the projection of one or more images. For example, a user may change the projection of an image or images by the projector device 1702 to the projection of an image or images by the projector device 1704 by selecting the projector device 1704 (e.g., swiping left) on the handheld device 1708. Alternatively, the handheld device 1708 may send a command to particular ones of the projector devices 1702, 1704, 1706 to stop projections of images if a user provides an input to the handheld device 1708 indicating such an action.

In some example embodiments, the images projected by the projector devices 1702, 1704, 1706 may be provided to the projector devices 1702, 1704, 1706 regardless of whether the projector devices 1702, 1704, 1706 are powered on or instructed to project the images. For example, the video source (e.g., a video camera) may continuously provide a video feed to the projector devices 1702, 1704, 1706, and the particular one or more of the projector devices 1702, 1704, 1706 that are powered on or instructed to project images may project the image (e.g., the video).

In some alternative embodiments, the projector devices 1702, 1704, 1706 may each retrieve information (e.g., weather information, traffic information, etc.) from a source, such as a cloud server (e.g., the processor device 1722), in response to a respective command from the handheld device 1708. The projector devices 1702, 1704, 1706 project an image that includes the retrieved information. A command from the handheld device 1708 to project images may be a power on command or another command that results in the projector devices 1702, 1704, 1706 projecting images.

In some example embodiments, the projector devices 1702, 1704, 1706 may retrieve information (e.g., weather information, etc.) based on a timer included in or coupled to the projector devices 1702, 1704, 1706. The projector devices 1702, 1704, 1706 may project an image including the retrieved information when the projector devices 1702, 1704, 1706 receive a respective command from the handheld device 1708 to project images. In some example embodiments, a command to project an image may not include information about the type of image or the source of the image, and the image (e.g., weather information, traffic information, a video, etc.) may be provided to or retrieved by the projector devices 1702, 1704, 1706 independent of commands to project images.

In some example embodiments, the handheld device 1708 may wirelessly send a dim command to one or more of the lighting fixtures 1712, 1714, 1718 in response to receiving one or more user inputs selecting one or more of the projector devices 1702, 1704, 1706 to project one or more images or one or more lights. For example, the handheld device 1708 may send the dim command to one or more of the lighting fixtures 1712, 1714, 1718 before or after sending one or more commands to the projector devices 1702, 1704, 1706 to project one or more images in response to a user input. In some example embodiments, one or more of the projector devices 1702, 1704, 1706 may send a dim command to one or more of the lighting fixtures 1712, 1714, 1718 in response to receiving a command to project one or more images.

For example, the projector devices 1702, 1704, 1706 may be configured with the network address of the lighting fixtures 1712, 1714, 1716, and may send a targeted or a broadcast dim command. The lighting fixtures 1712, 1714, 1716 may dim their emitted lights to a particular intensity level in response to receiving the dim command. The lighting fixtures 1712, 1714, 1716 may undim their lights in response to receiving an undim command from the handheld device 1708 or from one or more of the projector devices 1702, 1704, 1706 that may send an undim command in response to receiving a command to stop projecting a light. In some example embodiments, dim and undim commands from the handheld device 1708 may have a higher priority than such commands from the projector devices 1702, 1704, 1706. In some example embodiments, dimming and undimming of lights from the lighting fixtures may be controlled by the processor device 1722, which may serve as a local control.

In some example embodiments, the smart speaker 1718 may control the projector devices 1702, 1704, 1706 in a similar manner as described with the handheld device 1708 where user inputs to the handheld device 1708 are replaced by vocal commands provided to the smart speaker 1718. In some example embodiments, the smart speaker 1718 may be configured, automatically or through a manual process by a user, with the network addresses of the projector devices 1702, 1704, 1706 and the lighting fixtures 1712, 1714, 1716 as can be readily understood by those of ordinary skill in the art with the benefit of this disclosure. Additional configuration of the smart speaker 1718, for example, to associate labels with one or more of the projector devices 1702, 1704, 1706 and the lighting fixtures 1712, 1714, 1716 may be performed by a user in a standard manner of configuring smart speakers.

In some example embodiments, the smart speaker 1718 (e.g., AMAZON ECHO, GOOGLE HOME, etc.) may transmit commands to the one or more projector devices 1702, 1704, 1706 in response to vocal commands. For example, the vocal commands may be instructions to power on, off, etc. the one or more projector devices 1702, 1704, 1706. The vocal commands may also be instructions to have one or more of the projector devices 1702, 1704, 1706 project one or more images. To illustrate, a vocal command may be to have the projector device 1702 project particular information, such as weather information, where the projector device 1702 is identified by label, network address, etc. In response the smart speaker 1718 may send a corresponding command to the projector device 1702.

In some example embodiments, the smart speaker 1718 may send the vocally received command to a cloud server, such as the processor device 1722, that can generate the appropriate commands to be sent to one or more of the projector devices 1702, 1704, 1706. In some example embodiments, the smart speaker 1718 may provide the network addresses of the projector devices 1702, 1704, 1706 and the lighting fixtures 1712, 1714, 1716 to the processor device 1722 (e.g., a cloud server) such that the processor device 1722 can send commands and information, video images, etc. (i.e., images) to the appropriate ones of the projector devices 1702, 1704, 1706.

In some example embodiments, the smart speaker 1718 or the processor device 1722 may send dim commands to one or more of the lighting fixtures 1712, 1714, 1716 in response to vocal commands received by the smart speaker 1718 to start projection of one or more images by one or more of the projector devices 1702, 1704, 1706. In some example embodiments, the smart speaker 1718 or the processor device 1722 may send undim commands to one or more of the lighting fixtures 1712, 1714, 1716 in response to vocal commands received by the smart speaker 1718 to stop projection of one or more images by one or more of the projector devices 1702, 1704, 1706.

In some alternative embodiments, the system 1700 may include more or fewer projector devices and lighting fixtures than shown without departing from the scope of this disclosure. For example, the system 1700 may include just one projector device without departing from the scope of this disclosure. In some alternative embodiments, the handheld device 1708 or the smart speaker 1718 may be omitted without departing from the scope of this disclosure. In some example embodiments, the network device 1720 and the processor device 1722 may be omitted without departing from the scope of this disclosure. In some alternative embodiments, the projector devices 1702, 1704, 1706 may be installed in a different configuration than shown without departing from the scope of this disclosure.

Figure 18:
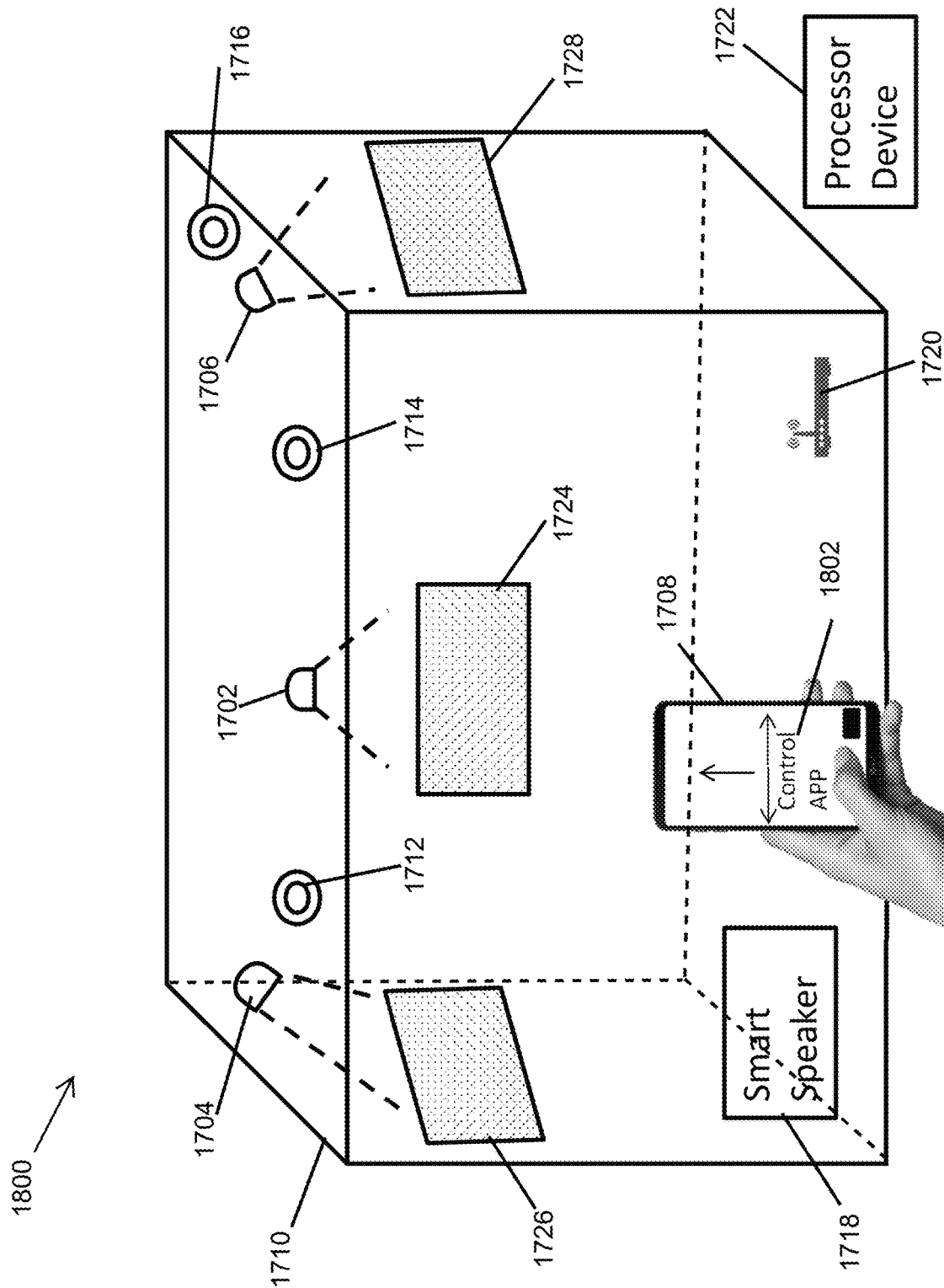
FIG. 18 illustrates a lighting and projector system including recessed projector devices according to another example embodiment.

FIG. 18 illustrates a lighting and projector system 1800 including recessed projector devices according to another example embodiment. The lighting and projector system 1800 is substantially similar the lighting and projector system 1700 of FIG. 17 and may operate in a substantially similar manner. In some example embodiments, the handheld device 1708 may include a control application 1802 that is executed by the handheld device 1708 to control operations of the recessed projector devices 1702, 1704, 1706 in a similar manner as described above with respect to FIG. 17. The handheld device 1708 may execute the control application 1802 to perform operations described above with respect to FIG. 17. The handheld device 1708 may also execute the control application 1802 to control operations of the lighting fixtures 1712, 1714, 1716.

In some example embodiments, the handheld device 1708 may associate one or more network addresses of the projector devices 1702, 1704, 1706 with particular user inputs as described above with respect to FIG. 17. For example, the control application 1802 may associate a swipe (e.g., using a finger or a stylus) of the touch-sensitive display screen toward a particular cardinal direction (i.e., north, south, east, or west) with a particular one or more of the projector devices 1702, 1704, 1706 and/or a command for the particular one or more of the projector devices 1702, 1704, 1706 to project one or more images, to stop projection of images, etc. By configuring the handheld device 1708 to associate a particular cardinal direction with particular one or more of the projector devices 1702, 1704, 1706 (e.g., using network addresses), the handheld device 1708 can interpret swipes of the screen of the handheld device 1708 in the particular cardinal direction as being directed to the associated one or more of the projector devices 1702, 1704, 1706 regardless of the orientation of the handheld device 1708.

In some example embodiments, the handheld device 1708 may include components that enable the handheld device 1708 to identify cardinal directions of swipes of the touch-sensitive screen of the handheld device 1708. To illustrate, the handheld device 1708 may include a 3-axis accelerometer, a 3-axis gyroscope and a 3-axis geomagnetic sensor that enable the handheld device 1708 to identify cardinal directions of swipes of the touch-sensitive screen of the handheld device 1708 regardless of the orientation of the handheld device 1708. In response to such swipes of the display screen, the handheld device 1708 may transmit commands intended for one or more of the projector devices 1702, 1704, 1706.

In some example embodiments, the projector device 1702, 1704, and 1706 may be associated by the handheld device 1708 with swipes in the directions of north, west, and south, respectively. In some example embodiments, the handheld device 1708 may also be configured to associate one or more projector devices with swipes in intercardinal directions, i.e., northeast, southeast, southwest, and northwest. Swipes of the screen of the handheld device 1708 in an associated intercardinal direction may result in the handheld device 1708 transmitting a command to the associated projector device.

In some alternative embodiments, the system 1700 may include more or fewer projector devices and lighting fixtures than shown without departing from the scope of this disclosure. For example, the system 1700 may include just one projector device without departing from the scope of this disclosure. In some alternative embodiments, the handheld device 1708 or the smart speaker 1718 may be omitted without departing from the scope of this disclosure. In some example embodiments, the network device 1720 and the processor device 1722 may be omitted without departing from the scope of this disclosure. In some alternative embodiments, the projector devices 1702, 1704, 1706 may be installed in a different configuration than shown without departing from the scope of this disclosure.

Figure 19:
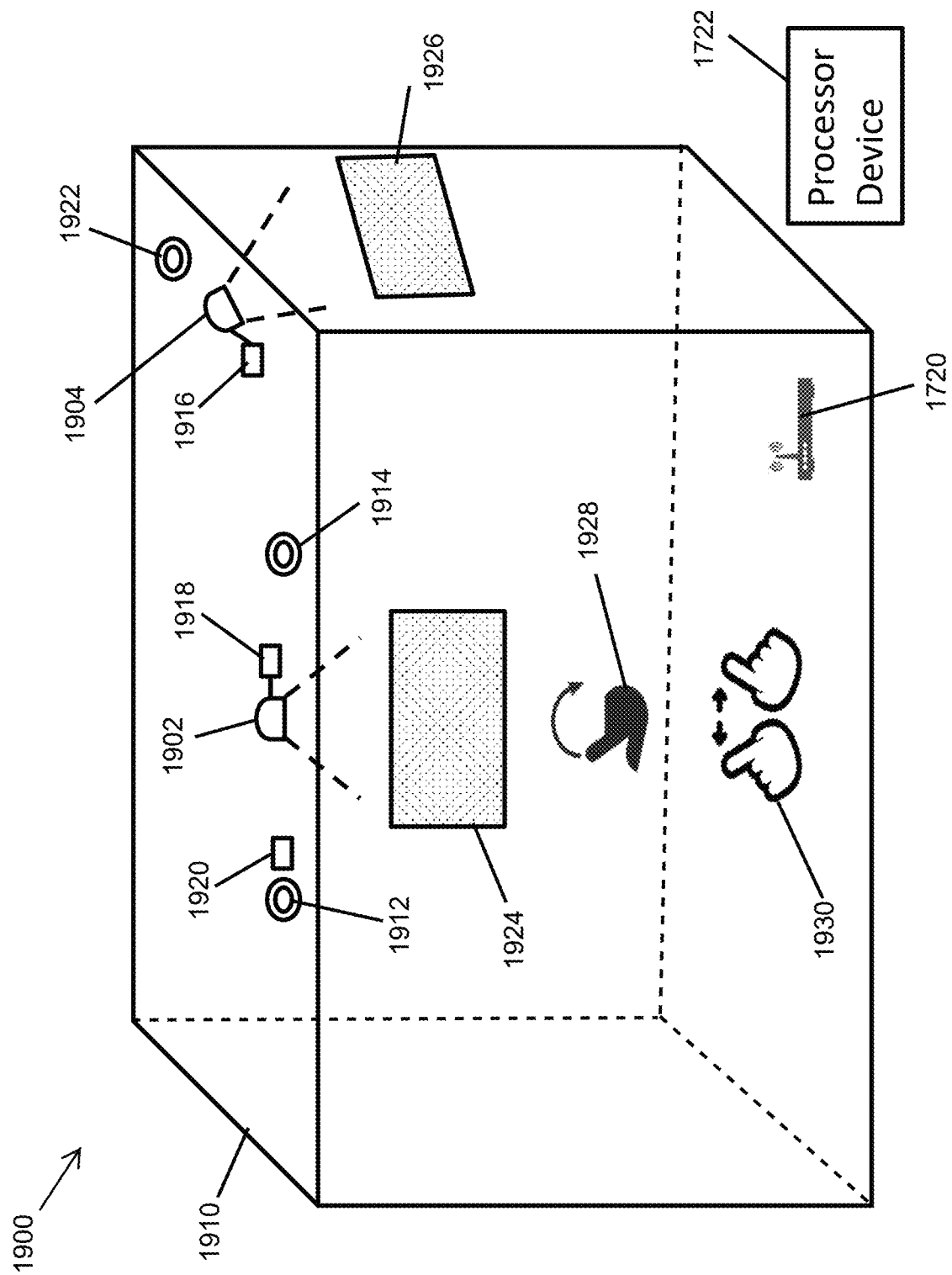
FIG. 19 illustrates a lighting and projector system including recessed projector devices according to another example embodiment.

FIG. 19 illustrates a lighting and projector system 1900 including recessed projector devices according to another example embodiment. In some example embodiments, the system 1900 includes projector devices 1902, 1904 and lighting fixtures 1912, 1914, 1922 that are recessed in a ceiling 1910. For example, the recessed projector devices 1902, 1904 may each be one of the recessed lighting and projector fixtures described above and may be installed in the ceiling 1910 in a similar manner as described above. The system 1900 may also include gesture recognition sensors 1916, 1918, 1920. For example, the gesture recognition sensor 1916 may be communicably coupled to the projector device 1904, and the gesture recognition sensor 1918 may be communicably coupled to the projector device 1902. For example, the gesture recognition sensor 1916 may be integrated into the projector device 1904, and the gesture recognition sensor 1918 may be integrated into the projector device 1902. The gesture recognition sensor 1920 may be communicably coupled with one or both of the projector devices 1902, 1904.

In some example embodiments, each of the gesture recognition sensors 1916, 1918, 1920 are capable of identifying and interpreting hand gestures, such as hand gestures 1928, 1930. Alternatively or in addition, the gesture recognition sensors 1916, 1918, 1920 may transmit gesture detection information to the processor device 1722, which may be a local controller or cloud server. For example, the gesture recognition sensors 1916, 1918, 1920 may communicate with the processor device 1722 through the network device 1720.

In some example embodiments, the gesture recognition sensors 1916, 1918, 1920 and/or the processor device 1722 may be configured to interpret particular hand gestures as being directed to one or more of the projector devices 1902, 1904 and/or as particular commands, such as a command to project an image or a light, to stop projection, etc. For example, in response to determining that a particular hand gesture is directed to the projector device 1902 and that it corresponds to a particular command, the gesture recognition sensor 1916 may provide the command to the projector device 1902. Alternatively, the gesture recognition sensor 1916 may provide information derived from the detected gesture to the projector device 1902, and the projector device 1902 can interpret the information to take the appropriate action, such as start projecting an image or a light, stop projection, retrieve information from a cloud server, etc. The other gesture recognition sensors 1918, 1920 may operate in a similar manner with other projector devices to control operations of one or more projector devices.

In some example embodiments, the processor device 1722 may process gesture detection information received from the gesture recognition sensors 1916, 1918, 1920 to identify and interpret hand gestures, and in response, transmit one or more corresponding commands (e.g., project an image, stop projection, etc.) to one or more of the projector devices 1902, 1904 depending on the interpretation of the gesture detection information by the processor device 1722. For example, the processor device 1722 may more reliably identify hand gestures by processing information from multiple gesture recognition sensors.

In some example embodiments, the projector device 1902 may project an image or a light on a surface 1924 in response to a hand gesture being interpreted as a command to project an image or a light. The projector device 1904 may project an image or a light on a surface 1926 in response to a hand gesture being interpreted as a command to project an image or a light. The projector devices 1902, 1904 similarly stop projection of images in response to the same hand gesture or a different hand gesture from the hand gesture that resulted in the projection of images.

In some example embodiments, one or more of the lighting fixtures 1912, 1914, 1922 may dim their lights in response to the projector devices 1902, 1904 projecting one or more images. For example, the projector devices 1902, 1904, the gesture recognition sensors 1916, 1918, 1920, and or the processor device 1722 may transmit dim and undim commands to the lighting fixtures 1912, 1914, 1922 depending on, for example, whether the projector devices 1902, 1904 are starting or stopping projecting images.

In some example embodiments, the system 1900 may include more or fewer projector devices and lighting fixtures than shown. In some example embodiments, some hand gestures may be associated with one projector device, and other hand gestures may be associated with another projector device. For example, a set of hand gestures may be associated with projecting an image or a light, stopping projecting of images, projecting particular images (e.g., weather information, etc.), and other operations related to the projector device 1902. Another set of hand gestures may be associated with similar operations related to the projector device 1904.

In some alternative embodiments, the network device 1720 and the processor device 1722 may be omitted without departing from the scope of this disclosure. In some alternative embodiments, the projector devices 1902, 1904, the gesture recognition sensors 1916, 1918, 1920, and the lighting fixtures 1912, 1914, 1922 may be installed in a different configuration than shown without departing from the scope of this disclosure.

Figure 20:
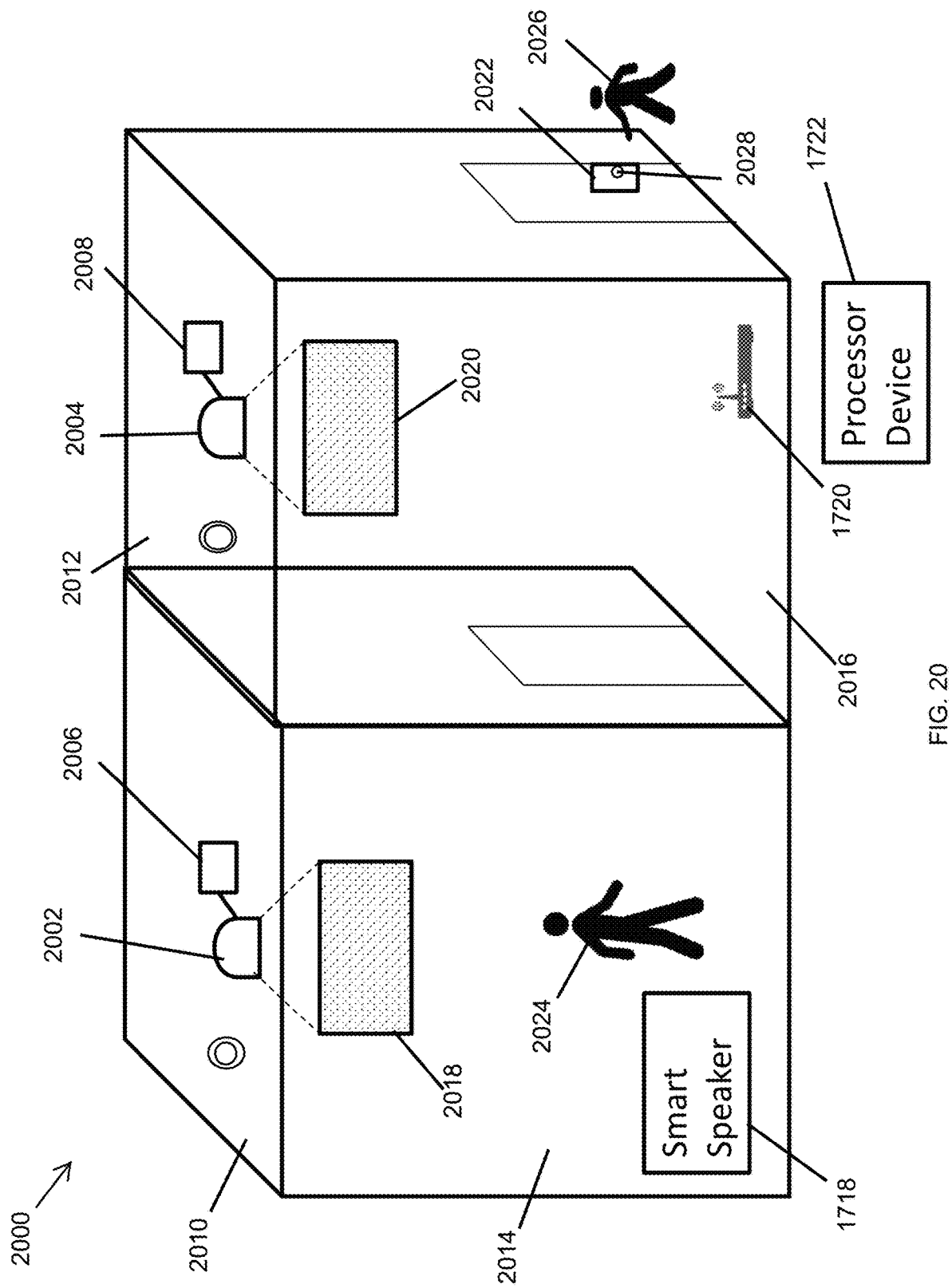
FIG. 20 illustrates a lighting and projector system including recessed projector devices according to another example embodiment.

FIG. 20 illustrates a lighting and projector system 2000 including recessed projector devices according to another example embodiment. In some example embodiments, the system 2000 includes recessed projector devices 2002, 2004. For example, the recessed projector devices 2002, 2006 may each be one of the recessed lighting and projector fixtures described above and may be installed in ceiling 2010, 2012 in a similar manner as described above. In some example embodiments, the system 2000 may also include occupancy sensors 2006, 2008. For example, the occupancy sensor 2006 may be integrated in the projector device 2002, and the occupancy sensor 2008 may be integrated in the projector device 2004. Alternatively, the occupancy sensors 2006, 2008 may be standalone sensors.

In some example embodiments, the occupancy sensors 2006, 2008 may each include one or more of a motion sensor, a Bluetooth Low Energy unit, visible light unit, a camera, etc. that can be used to detect occupancy of a space as can be readily understood by those of ordinary skill in the art with the benefit of this disclosure. For example, the occupancy sensors 2006, 2008 may be passive infrared sensors.

In some example embodiments, the recessed projector device 2002 may be positioned to project an image or a light on a surface 2018 in a room 2014, and the recessed projector device 2004 may be positioned to project an image or a light on a surface 2020 in a room 2016. In some example embodiments, the sensor 2006 may control operations of the recessed projector device 2002, and the sensor 2008 may control operations of the recessed projector device 2004.

To illustrate, the projector device 2002 may project an image or a light (e.g., a shaped light) in response to an occupancy detection by the occupancy sensor 2006. For example, the occupancy sensor 2006 may send a command or other detection indicator information to the projector device 2002 in response to detecting one or more occupants in the room 2014. The projector device 2002 may project an image or a light immediately or a period of time (e.g., 30 seconds) after receiving the command or information from the occupancy sensor 2006.

The projector device 2002 may stop projecting the image or the light when no detection of occupancy of the room 2014 is indicated by the occupancy sensor 2006 for a period of time (e.g., 20 minutes). In some example embodiments, the projector device 2002 may stop projecting the image or the light in the absence of a detection of occupants for a time period regardless of whether the projector device 2002 started projecting the image or the light in response to a detection by the sensor 2006.

In some example embodiments, the projector device 2004 may project an image or a light (e.g., a shaped light) in response to an occupancy detection by the occupancy sensor 2008. For example, the occupancy sensor 2008 may send a command or other detection indicator information to the projector device 2004 in response to detecting one or more occupants in the room 2016. The projector device 2004 may project an image or a light immediately or for a period of time (e.g., 20 seconds) after receiving the command or information from the occupancy sensor 2008.

The projector device 2004 may stop projecting the image or the light when no detection of occupancy of the room 2016 is indicated by the occupancy sensor 2008 for a period of time (e.g., 10 minutes). In some example embodiments, the projector device 2004 may stop projecting the image or the light in the absence of a detection of occupants for a time period regardless of whether the projector device 2004 started projecting the image or the light in response to a detection by the sensor 2008.

In some example embodiments, the source of the image projected by the recessed projector devices 2002, 2004 may be a video camera 2028 of a doorbell device 2022 or a video camera of a security system. For example, when a person 2026 rings the doorbell device 2022, the doorbell device 2022 may send a message or a command to one or both projector devices 2002, 2004 or to one or more other devices such as the sensors 2006, 2008, the processor device 1722 (operating as a local or cloud server), a handheld device, etc. The doorbell device 2022 may also send a video stream to the projector devices 2002, 2004 or to the processor device 1722, a handheld device, etc. When the sensor 2006 detects a person 2024 in the room 2014, the sensor 2006 may provide a command to the projector device 2002 to project an image or otherwise indicate the detection of one or more occupants to the projector device 2002. In response, the projector device 2002 may project the image (i.e., the video showing the person 2026). Because no occupants are detected by the sensor 2008, the projector device 2004 may not project the video showing the person 2026. If the person 2024 or another person enters the room 2016, the projector device 2004 may start projecting the video following the detection of the person 2024 or the other person by the sensor 2008.

In some example embodiments, the doorbell device 2022 and the projector devices 2002, 2004 may communicate through the network device 1720 or via wired connections. In some example embodiments, the sensors 2006, 2008 may send detection information to the processor device 1722 that may transmit one or more commands to the projector devices 2002, 2004 depending on the information from the sensor 2006, 2008. For example, the processor device 1722 may transmit a command to the projector device 2002 to project an image in response to the sensor 2006 indicating to the processor device 1722 a detection of one or more occupants. The processor device 1722 may transmit a command to the projector device 2004 to project an image in response to the sensor 2008 indicating to the processor device 1722 a detection of one or more occupants. The processor device 1722 may transmit a command to stop projecting an image if no indications of occupants are received for a period of time or if an indication of no occupants is received for a period of time.

To illustrate, the sensor 2006 may indicate the detection of one or more occupants to the processor device 1722. For example, the processor device 1722, which also receives a message when the person 2026 rings the doorbell device 2022, may send a command to the projector device 2002 to project the video steam based on both the occupancy detection by the sensor 2006 and the doorbell indication from the doorbell device 2022. The video stream may be provided to the projector device 2002 directly from the doorbell device 2002 or indirectly through the processor device 1722. The processor device 1722 may operate in a similar manner to control the operation of the projector device 2004. In some example embodiments, a handheld device, such as the handheld device 1708, may operate in a similar manner as the processor device 1722 to control the operation of the projector devices 2002, 2004. In some example embodiments, the projector devices 2002, 2004 may operate with a security system in a similar manner as described with respect to the doorbell device 2022.

In some example embodiments, the smart speaker 1718 may operate in a similar manner as described above to control operations of the projector devices 2002, 2004. In some example embodiments, a control device, such as the handheld device 1708, may be used in a similar manner as described above to control operations of the projector devices 2002, 2004. In some example embodiments, the projector devices 2002, 2004 may also be controlled based on time scheduled and/or timers. In some example embodiments, lighting fixtures in the rooms 2014, 2018 may be dimmed and undimmed in a similar manner as described above.

In some example embodiments, the system 2000 may include more or fewer projector devices and sensors than shown without departing from the scope of this disclosure. In some alternative embodiments, the network device 1720 and the processor device 1722 may be omitted without departing from the scope of this disclosure. In some alternative embodiments, the projector devices and sensors may be installed in a different configuration than shown without departing from the scope of this disclosure.

Referring to FIGS. 17-20, in some example embodiments, a method of operation of the lighting and projector systems 1700, 1800, 1900, 2000 may include receiving, by a first one of the recessed projector devices of the systems 1700, 1800, 1900, 2000, an image to be projected. For example, the image may be or may include weather information, traffic information, a video, a picture, etc. The image may be received from an image source such as a laptop, a handheld device, a cloud server, a local server, a video camera, etc. The method of operation of the lighting and projector systems 1700, 1800, 1900, 2000 may also include receiving, by a second one of the recessed projector devices of the systems, the image to be projected. For example, the second recessed projector device may receive the same image as received by the first recessed projector device from the same source or a different source. Alternatively, the second recessed projector device may receive a different image from the same source or a different source. The method may also include receiving, by the first recessed projector device, a command to project the image. For example, the command may be received from the handheld device 1708, the smart speaker 1718, one or more of the gesture recognition sensors 1916, 1918, 1920, the occupancy sensors 2006, 2008, a local or cloud controller (e.g., the processor device 1722), a security system, a doorbell device, etc. In response to the received command, the first recessed projector device may project the image on a surface (e.g., the surface 1724, 1924, 2018) below the first recessed projector device. The method may also include receiving by the second recessed projector device a second command to project the same or a different image. For example, the second command may be received from the handheld device 1708, the smart speaker 1718, one or more of the gesture recognition sensors 1916, 1918, 1920, the occupancy sensors 2006, 2008, a local or cloud controller (e.g., the processor device 1722), a security system, a doorbell device, etc. In response to the second command, the second recessed projector device may project the same or a different image on a surface (e.g., the surface 1726, 1926, 2020) below the second recessed projector device. In some example embodiments, the method may also include receiving, by the first recessed projector device, a third command to stop projecting the image and stopping projecting the image in response to the third command.

Figure 21:
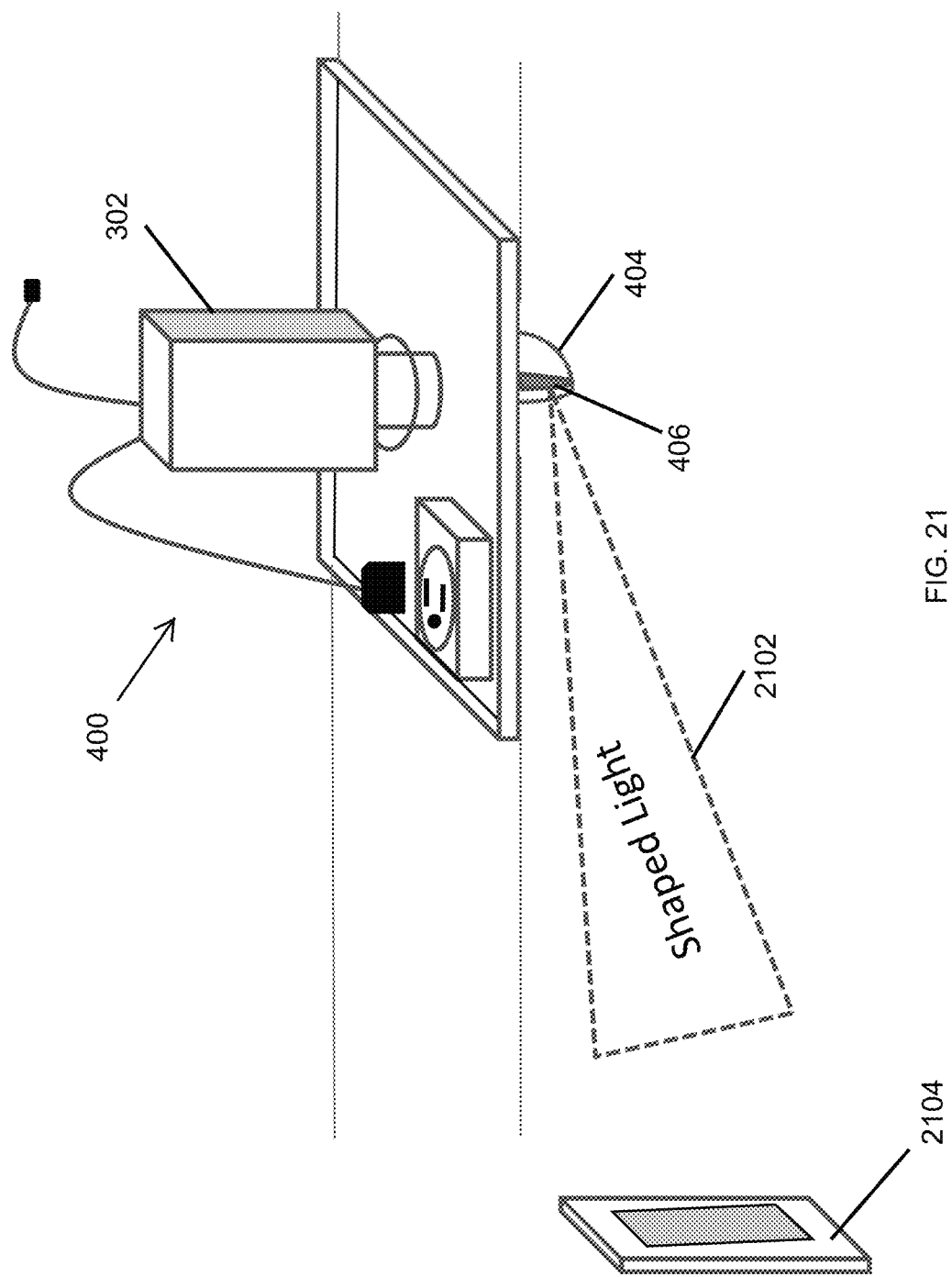
FIG. 21 illustrates a lighting and projector system projecting a shaped light according to an example embodiment.
Figure 22F:
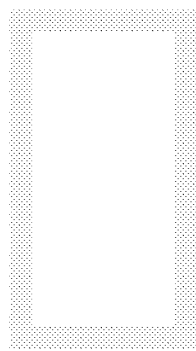
FIGS. 22A-22F illustrate examples of shaped lights according to an example embodiment.
Figure 22D:
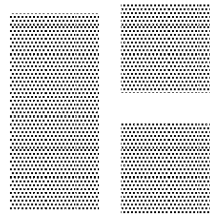
Figure 22E:
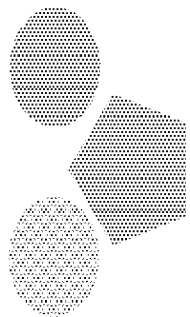
Figure 22A:
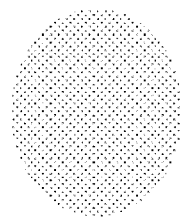
Figure 22B:
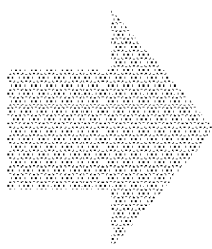
Figure 22C:
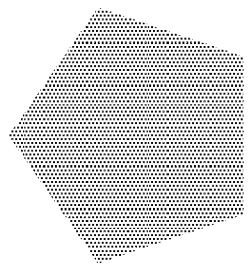

FIG. 21 illustrates the lighting and projector fixture 400 projecting a shaped light according to an example embodiment. FIGS. 22A-22F illustrate examples of shaped lights according to an example embodiment. In some example embodiments, the lighting and projector fixture 400 includes a projector device 302 (or another projector device) that can emit or project a shaped light 2102. For example, the shaped light 2102 may serve as an accent light for an artwork 2104, to provide directions, to provide particular color lights, etc. In some example embodiments, the shaped light may be a highly focused light. For example, the shaped light 2102 may correspond to one or more of the shaped lights shown in FIGS. 22A-22F. The shaped light 2102 may have different shapes that correspond to different areas of a poster, a painting, etc.

In some example embodiments, the shaped light 2102 may be a framed light, where the light is shaped as a frame. For example, the shaped light 2102 may be a framed light, such as the framed light shown in FIG. 22F, that can be projected as a frame of the artwork 2104 or may be used for other purposes without departing from the scope of this disclosure.

In some example embodiments, other lighting and projector fixtures described above (e.g., the lighting and projector fixtures 300, 500, 600, 900, etc.) may provide shaped lights including the shaped lights shown in FIGS. 22A-22F and framed lights. For example, shaped lights projected on a floor or a wall may be used to provide directions, for entertainment, etc. The lighting and projector fixture 400 may project the shaped light using a particular lens designed to produce the shaped light, a particular shape image, or other means as may be contemplated by those of ordinary skill in the art with the benefit of this disclosure.

Figure 23:
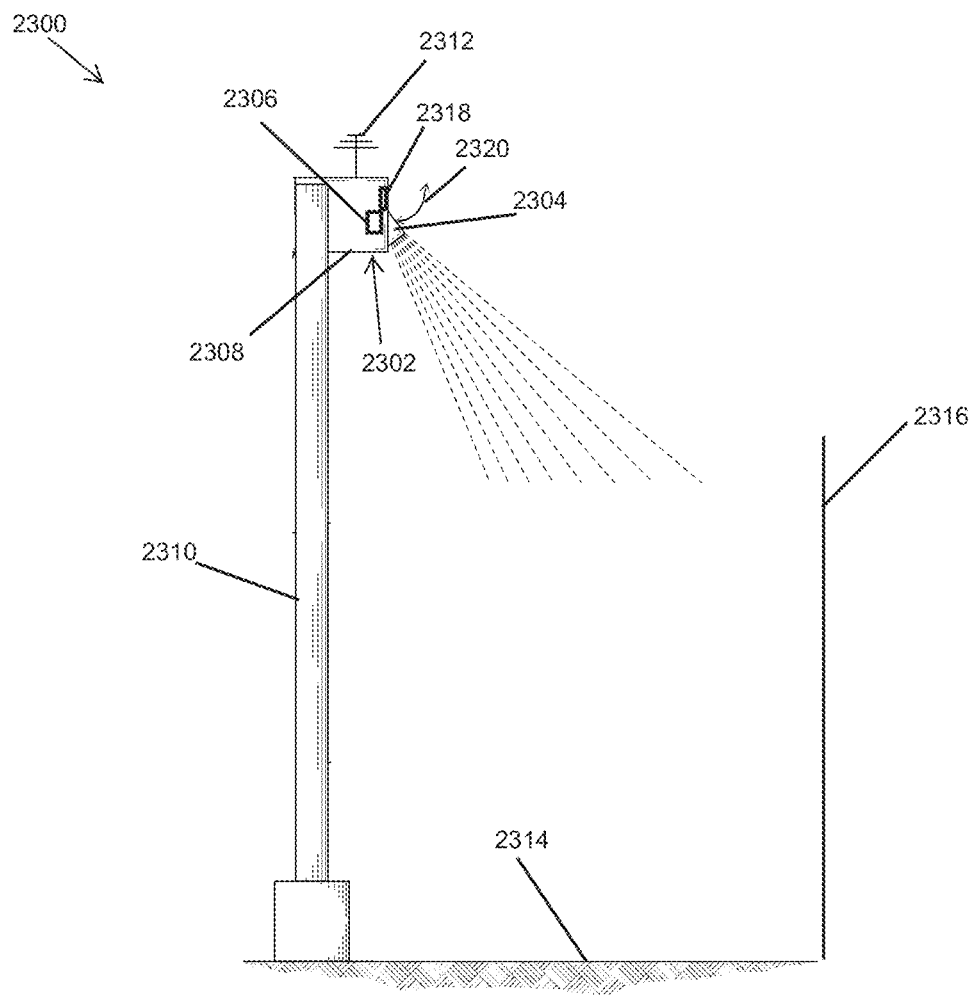
FIG. 23 illustrates a lighting and projector fixture including a lighting and projector fixture according to another example embodiment.

FIG. 23 illustrates a lighting and projector system 2300 including a lighting and projector fixture 2302 according to another example embodiment. In some example embodiments, the lighting and projector fixture 2302 includes a lighting and projector module 2304 and a power and control module 2306. The lighting and projector module 2304 and the power and control module 2306 may be positioned in a housing 2308 that is attached to a pole 2310 that extends up from the ground 2314.

In some example embodiments, the lighting and projector fixture 2302 may correspond to or may include the lighting and projector device 200 of FIG. 2. For example, the lighting and projector module 2304 may correspond to the lighting and projector module 202 of FIG. 2. The power and control module 2306 may include the power source 204 and the controller 206.

In some example embodiments, the lighting and projector module 2304 may operate to provide a light for illumination in one mode and may operate to project information (e.g., safety related information) in another mode. For example, the lighting and projector module 2304 may provide a light to illuminate the ground 2314 and/or a wall 2316. When operating as a projector, the lighting and projector module 2304 may project information, etc. on the ground 2314 and/or on the wall 2316. The orientation of the lighting and projector module 2304 may be adjustable along the path illustrated by the arrow 2320 to direct the light provided by the lighting and projector module 2304 in a desired direction.

In some example embodiments, an antenna 2312 may be used to wirelessly receive and transmit signals. Alternatively or in addition, the lighting and projector fixture 2302 may receive, via a wired connection, lighting control and other instructions as well as images to be projected. The antenna 2312 may be omitted or may be positioned at a different location.

In some example embodiments, the lighting and projector fixture 2302 may include a heat sink 2318 that is used to dissipate heat from the lighting and projector fixture 2302. In some example embodiments, the housing 2308 may serve as a heat sink. For example, a fan that is ordinarily included with standalone projectors may be omitted or a smaller fan may be used.

In some alternative embodiments, the heat sink 2318 may be omitted. In some alternative embodiments, the lighting and projector system 2300 may be implemented as an indoor lighting system instead of the outdoor light system shown in FIG. 23.

Figure 24:
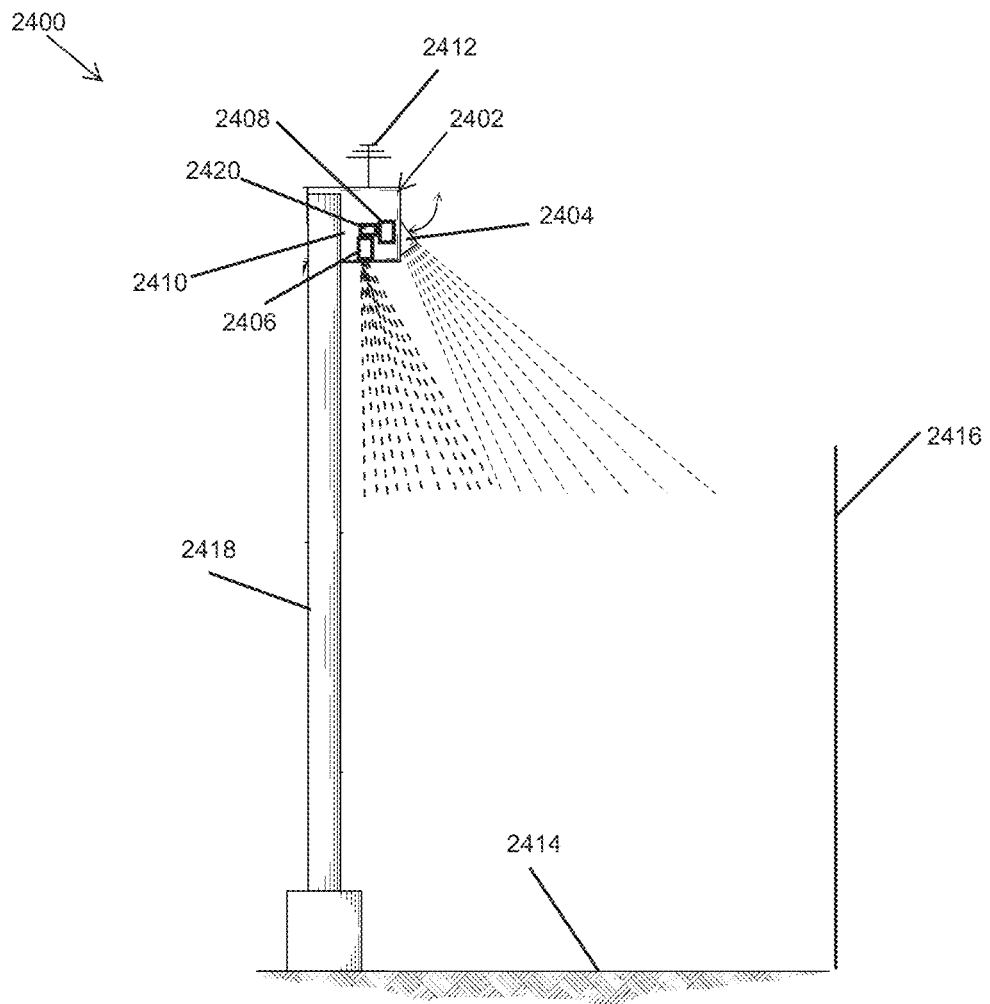
FIG. 24 illustrates a lighting and projector fixture including a lighting and projector fixture according to another example embodiment.

FIG. 24 illustrates a lighting and projector system 2400 including a lighting and projector fixture 2402 according to another example embodiment. In some example embodiments, the lighting and projector fixture 2402 includes a projector module 2404, a lighting module 2406, and a power and control module 2408. The projector module 2404, the lighting module 2406, and the power and control module 2408 may be positioned in a housing 2410 that is attached to a pole 2418 that extends up from the ground 2414.

In some example embodiments, the lighting module 2406 may provide an illumination light, and the projector module 2404 may project an image, for example, on the ground 2414 and/or on a wall 2416. The orientation of the projector module 2404 may be adjusted to direct the projection toward a desired surface.

In some example embodiments, the projector module 2404 and the lighting module 2406 may include separate light sources. Alternatively, the projector module 2404 may not include a light source, where a portion of the light emitted by the light source of the lighting module 2406 is directed within the housing 2410 to be used by the projector module 2404 for projection. In some alternative embodiments, the lighting module 2406 may not include a light source, where a portion of the light emitted by the light source of the projector module 2404 is directed within the housing 2410 to be emitted by the lighting module 2406 for illumination. In some example embodiments, the lighting and projector system 2400 may be used in a parking lot or garage to provide directions (e.g., via arrows projected down on the ground) to available parking spaces.

In some example embodiments, the lighting and projector fixture 2402 may include a heat sink 2420 that is used to dissipate heat from the lighting and projector fixture 2402. In some example embodiments, the housing 2410 may serve as a heat sink. For example, a fan that is ordinarily included with standalone projectors may be omitted or a smaller fan may be used.

In some alternative embodiments, the heat sink 2420 may be omitted. In some alternative embodiments, the lighting and projector system 2400 may be implemented as an indoor lighting system instead of the outdoor light system shown in FIG. 24.

Figure 25:
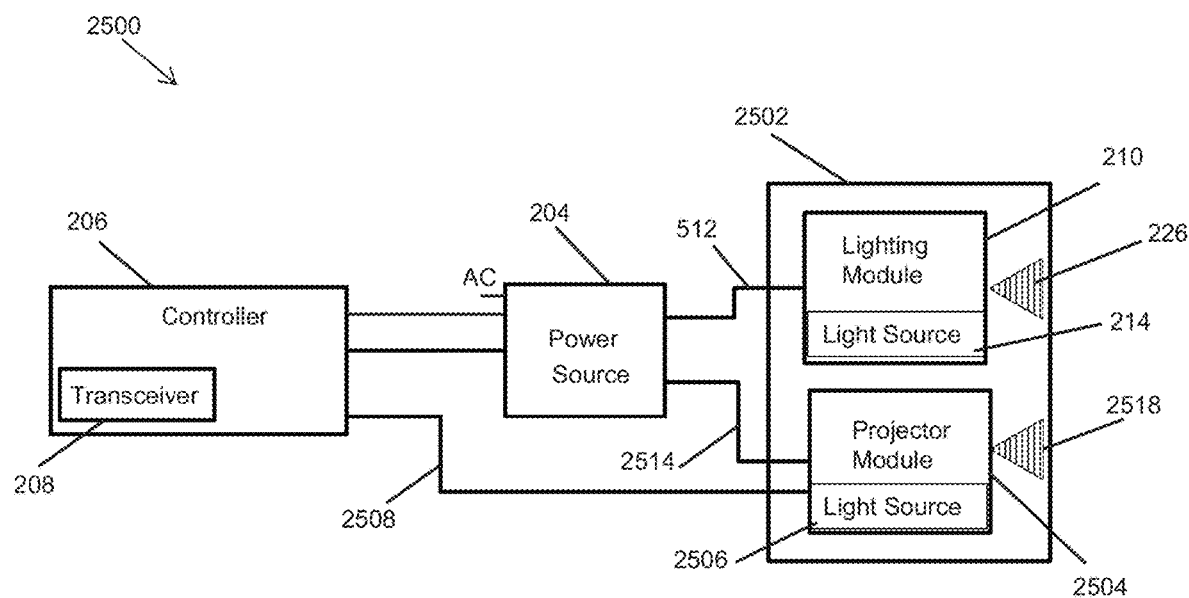
FIG. 25 illustrates a block diagram of a lighting and projector fixture according to an example embodiment.

FIG. 25 illustrates a block diagram of a lighting and projector fixture 2500 according to an example embodiment. For example, the lighting and projector fixture 2500 may correspond to the lighting and projector fixture 2402 of FIG. 24. In some example embodiments, the lighting and projector fixture 2500 includes a lighting and projector module 2502, the power source 204, and the controller 206. The lighting and projector module 2502 includes the lighting module 210 and a projector module 2504. In some example embodiments, the power source 204 and the controller 206 may be included in the power and control module 2408 of FIG. 24.

In some example embodiments, the power source 204, the controller 206, and the lighting module 210 operate in substantially the same manner as described above. The projector module 2504 includes a light source 2506 that is used to provide the light 2518 used to project an image. The light source 214 of the lighting module 210 provides the light 226 that is used for illumination. The lighting and projector fixture 2500 can provide the illumination light 226 and project images independently as well as simultaneously.

In some alternative embodiments, the components of the lighting and projector fixture 2500 may be connected in a different configuration than shown without departing from the scope of this disclosure. In some alternative embodiments, the lighting and projector fixture 2500 may include other components without departing from the scope of this disclosure. In some alternative embodiments, some of the components of the lighting and projector fixture 2500 may be integrated into a single component without departing from the scope of this disclosure. In some alternative embodiments, some of the components of the lighting and projector fixture 2500 may be replaced by multiple components without departing from the scope of this disclosure.

Figure 26:
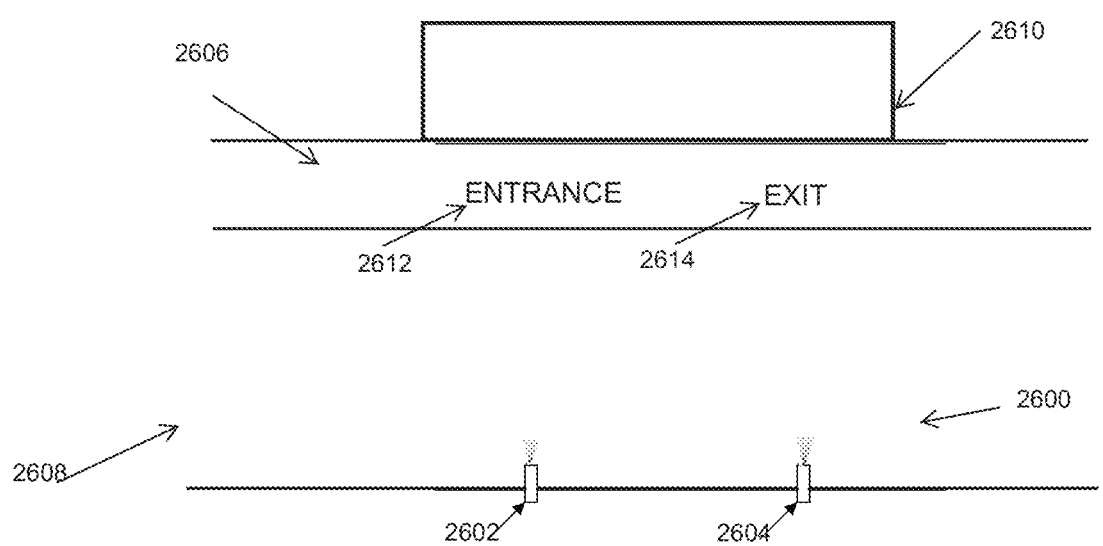
FIG. 26 illustrates a system of lighting and projector fixtures according to another example embodiment.

FIG. 26 illustrates a system 2600 of lighting and projector systems 2602, 2604 according to another example embodiment. In some example embodiments, the lighting and projector systems 2602, 2604 may each correspond to the lighting and projector systems 2300, 2400. As illustrated in FIG. 26, the lighting and projector system 2602 may project a message 2612 on a walkway 2606 indicating an entrance to a building 2610. The lighting and projector system 2604 may project a message 2614 on the walkway 2606 indicating an exit from the building 2610.

The lighting and projector systems 2602, 2604 may project other images on the walkway 2606 and/or on the street 2608. The lighting and projector systems 2602, 2604 may also emit illumination lights on to the walkway 2606 or the street 2608 at the same time as the messages 2612, 2614 or alternatively.

In some example embodiments, the lighting and projector systems 2602, 2604 may emit other messages, warnings, other types of images, etc. In some example embodiments, the lighting and projector systems 2602, 2604 may be used in a parking lot or garage to provide directions (e.g., via arrows projected down on the ground) to available parking spaces. In some example embodiments, the lighting and projector systems 2602, 2604 may be responsive to integrated or external motion sensors to emit illumination lights and project images. In some example embodiments, the system 2600 may include just one lighting and projector system or more than two lighting and projector systems.

Figure 27:
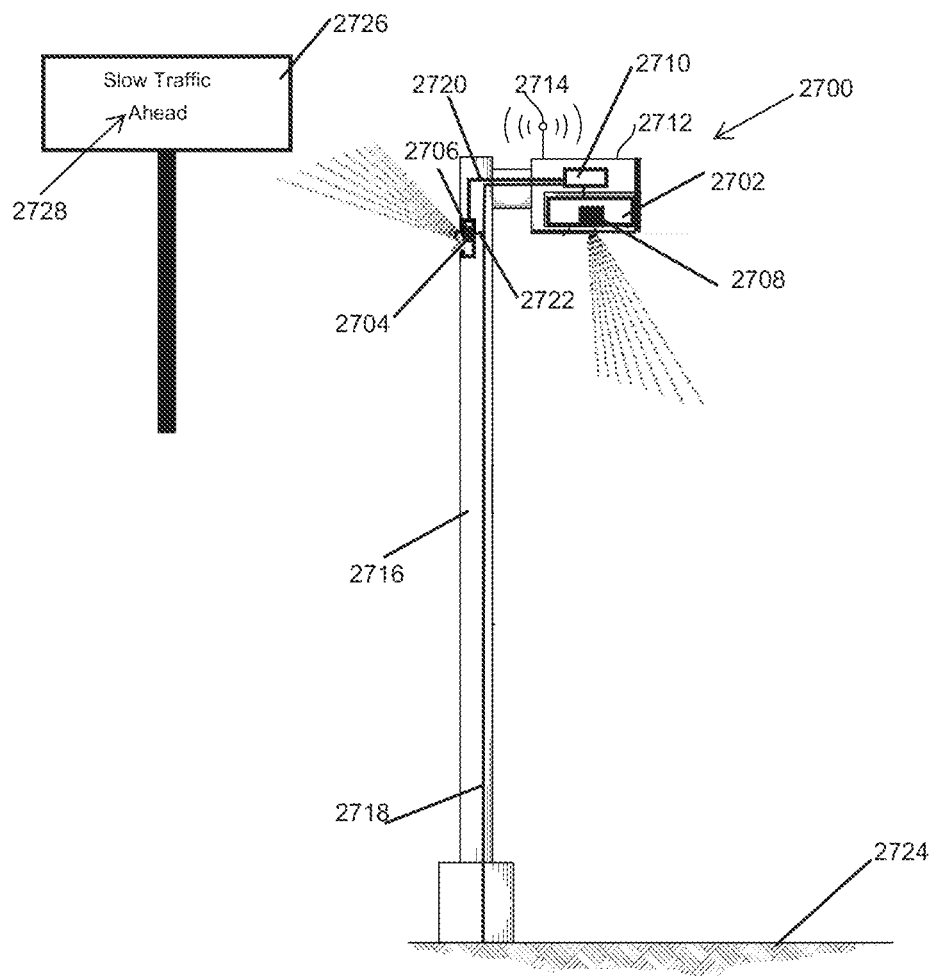
FIG. 27 illustrates a lighting and projector system including a lighting and projector fixture according to another example embodiment.

FIG. 27 illustrates a lighting and projector system 2700 according to another example embodiment. The lighting and projector system 2700 may include a lighting module 2702 and a projector module 2704. The projector module 2704 may include a light source 2706, and the lighting module 2702 may include a light source 2708. The lighting and projector system 2700 may also include a power and control module 2710 that provides power to the lighting module 2702 and the projector module 2704.

In some example embodiments, the lighting module 2702 and the power and control module 2710 may be inside a housing 2712, and the housing 2712 may be attached to a pole 2716. The projector module 2704 may be attached to the pole 2716. The projector module 2704 may be at least partially positioned within a hollow cavity of the pole 2716. The pole 2716 may serve as a heat sink for the projector module 2704. For example, by using the pole 2716 as a heat sink, a fan that is ordinarily included with standalone projectors may be omitted or a smaller fan may be used.

Electrical cable 2718 may provide AC power to the power and control module 2710, and the power and control module 2710 may generate DC power to power the lighting module 2702 and the projector module 2704. The power and control module 2710 may provide different power levels that are suitable for the lighting module 2702 and the projector module 2704. For example, the power and control module 2710 may provide a first voltage level to the lighting module 2702 and a second voltage level to the projector module 2704. In some alternative embodiments, the projector module 2704 may generate DC power from the AC power received via a connection 2722 instead of receiving DC power from the power and control module 2710.

In some example embodiments, the power and control module 2710 may receive lighting control and images (e.g., information, pictures, etc.) to be projected wirelessly or via a wired connection. The power and control module 2710 may control operation of the lighting module 2702 to control the light emitted by the light source 2708 based on received lighting instructions, programmed schedules, sensor outputs, etc. For example, the power and control module 2710 may control whether the light source 2708 emits a light as well as the intensity level, CCT, color, etc. of the light emitted by the light source 2708.

The power and control module 2710 may control operations of the projector module 2704 based on received instructions and information, programmed schedules, sensor outputs, etc. For example, the power and control module 2710 may control whether the projector module 2704 projects a message 2728 (e.g., traffic information, weather information, safety related information, advertisement, etc.) on a surface, such as a billboard 2726. The power and control module 2710 may provide to the projector module 2704 the images (e.g., information, pictures, etc.) to be projected.

Figure 28:
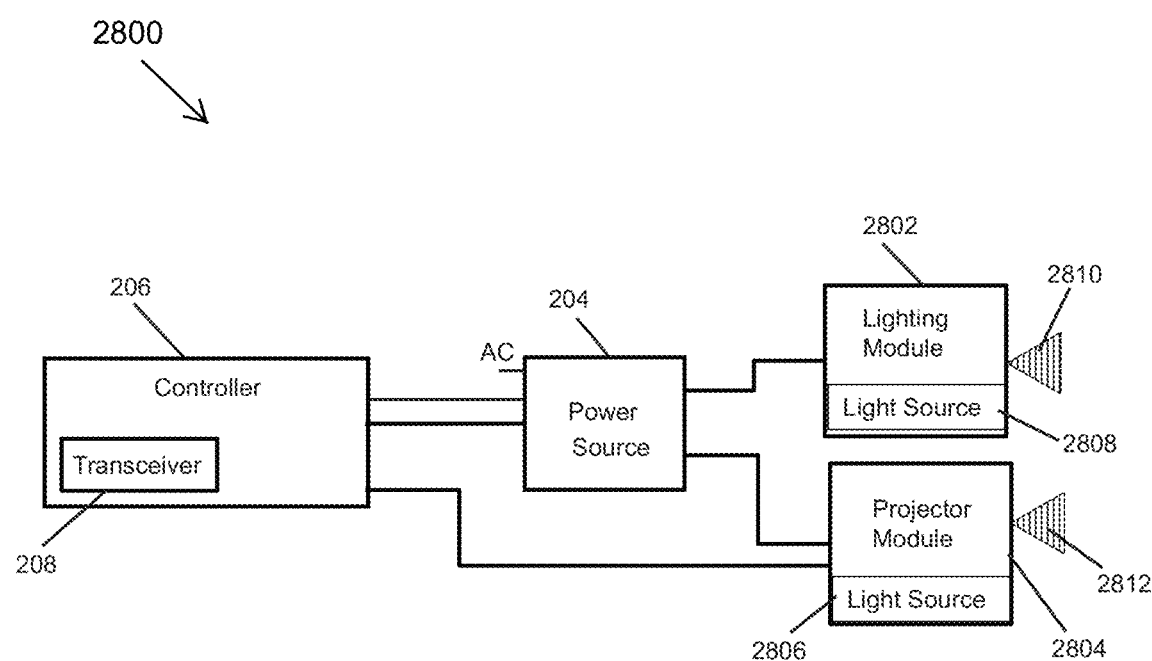
FIG. 28 illustrates a block diagram of a lighting and projector system according to an example embodiment.

FIG. 28 illustrates a block diagram of a lighting and projector system 2800 according to an example embodiment. For example, the lighting and projector system 2800 may correspond to or may be included in the lighting and projector system 2700 of FIG. 27.

In some example embodiments, the lighting and projector system 2800 includes a lighting module 2802, a projector module 2804, the power source 204, and the controller 206. In some example embodiments, the power source 204 and the controller 206 may be included in the power and control module 2710 of FIG. 27.

In some example embodiments, the power source 204 and the controller 206 operate in substantially the same manner as described above. In some example embodiments, the lighting module 2802 operates in substantially the same manner as described above with respect to the lighting module 210.

In some example embodiments, the projector module 2804 includes a light source 2806 that provides a light 2812 for projecting an image. The light source 2808 of the lighting module 2802 provides a light 2810 that is used for illumination. The lighting and projector system 2800 can provide the illumination light 2810 and project images (e.g., information, pictures, etc.) independently as well as simultaneously.

In some alternative embodiments, the components of the lighting and projector system 2800 may be connected in a different configuration than shown without departing from the scope of this disclosure. In some alternative embodiments, the lighting and projector system 2800 may include other components without departing from the scope of this disclosure. In some alternative embodiments, some of the components of the lighting and projector system 2800 may be integrated into a single component without departing from the scope of this disclosure. In some alternative embodiments, some of the components of the lighting and projector system 2800 may be replaced by multiple components without departing from the scope of this disclosure.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A system of projection fixtures and lighting fixtures, the system comprising:
   a first projection fixture recessed in a ceiling, the first projection fixture comprising a first projector device positioned to project a first image on a first surface below the ceiling; and
   a second projection fixture recessed in the ceiling, the second projection fixture comprising a second projector device positioned to project a second image on a second surface below the ceiling, wherein the first projector device is configured to project the first image on the first surface below the ceiling in response to receiving a projection control command and to send, in response to receiving the projection control command, a lighting control command to a lighting fixture to control an illumination light provided by the lighting fixture.

2. The system of claim 1, wherein the first projection fixture and the second projection fixture each comprise:
   a lighting module configured to emit a light; and
   a projection module configured to project images using the light.

3. The system of claim 1, wherein the first projection fixture is configured to project the first image in response to the projection control command received from a control device.

4. The system of claim 3, wherein the second projector device is configured to project the second image in response to a detection of one or more occupants by an occupancy sensor.

5. The system of claim 3, wherein the second projector device is configured to project the second image based on a programmed time schedule.

6. A system of lighting and projector devices, the system comprising:
   multiple projection fixtures that are recessed in a ceiling; and a control device configured to control projections of images by one or more projection fixtures of the multiple projection fixtures in response to user inputs provided to the control device, wherein the control device is configured to send a lighting control command to a lighting fixture in response to a user input of the user inputs to control the projections of images by the one or more projection fixtures.

7. The system of claim 6, wherein a first projection fixture of the multiple projection fixtures is positioned to project a first image on a first surface below the ceiling and wherein a second projection fixture of the multiple projection fixtures is positioned to project a second image on a second surface below the ceiling.

8. The system of claim 6, wherein a projection fixture of the multiple projection fixtures is configured to project an image in response to a user input received via a screen of the control device.

9. The system of claim 8, wherein a second projection fixture of the multiple projection fixtures is configured to project a second image in response to a second user input received by the control device.

10. The system of claim 9, wherein the user input and the second user input each include a swipe of the screen of the control device toward a side of the screen.

11. The system of claim 6, wherein the lighting control command includes a dim command to reduce an intensity level of an illumination light emitted by the lighting fixture.

12. The system of claim 6, wherein the lighting control command includes an undim command to increase the intensity level of an illumination light emitted by the lighting fixture.

13. The system of claim 6, wherein the control device is a smart speaker that responds to voice commands.

14. A method of operation of a lighting and projector system, the method comprising:
receiving, by a first recessed projection fixture, an image to be projected;
receiving, by a second recessed projection fixture, the image to be projected;
receiving, by the first recessed projection fixture, a projection control command to project the image;
in response to the projection control command to project the image, transmitting, by the first recessed projection fixture, a lighting control command to a lighting fixture to dim an illumination light provided by the lighting fixture; and
projecting, by the first recessed projection fixture, the image on a surface below the first recessed projection fixture.

15. The method of claim 14, further comprising:
receiving, by the second recessed projection fixture, a second projection control command to project the image; and
projecting, by the second recessed projection fixture, the image on a surface below the second recessed projection fixture.

16. The method of claim 15, further comprising:
receiving, by the first recessed projection fixture, a third projection control command to stop projecting the image; and
stopping, by the first recessed projection fixture, projecting the image; and
in response to the third projection control command, transmitting, by the first recessed projection fixture, a second lighting control command to the lighting fixture to undim the illumination light provided by the lighting fixture.

17. The method of claim 16, wherein the third projection control command is received by the first recessed projection fixture from a control device.

18. The method of claim 14, wherein the image is received by the first recessed projection fixture and by the second recessed projection fixture from a video source.

19. The system of claim 11, wherein the user input includes a command to start a projection by the one or more projection fixtures.

20. The system of claim 12, wherein the user input includes a command to stop a projection by the one or more projection fixtures.

* * * * *